(12) United States Patent
Pranov

(10) Patent No.: US 12,173,933 B2
(45) Date of Patent: Dec. 24, 2024

(54) SAFETY LENS

(71) Applicant: HELIAC APS, Hørsholm (DK)

(72) Inventor: Henrik Pranov, Espergaerde (DK)

(73) Assignee: HELIAC A/S, Niva (DK)

( * ) Notice: Subject to any disclaimer, the term of this patent is extended or adjusted under 35 U.S.C. 154(b) by 407 days.

(21) Appl. No.: 17/631,614

(22) PCT Filed: Aug. 1, 2020

(86) PCT No.: PCT/EP2020/071746
§ 371 (c)(1),
(2) Date: Jan. 31, 2022

(87) PCT Pub. No.: WO2021/023681
PCT Pub. Date: Feb. 11, 2021

(65) Prior Publication Data
US 2022/0275970 A1    Sep. 1, 2022

(30) Foreign Application Priority Data

Aug. 2, 2019   (GB) ...................................... 1911080

(51) Int. Cl.
*G02B 3/08*      (2006.01)
*F24S 23/00*     (2018.01)
(Continued)

(52) U.S. Cl.
CPC ............... *F24S 23/31* (2018.05); *F24S 23/10* (2018.05); *G02B 3/08* (2013.01); *G02B 5/045* (2013.01)

(58) Field of Classification Search
CPC .. F24S 23/31; F24S 23/10; F24S 30/45; F24S 40/00; G02B 3/08; G02B 5/045; Y02E 10/47
(Continued)

(56) References Cited

U.S. PATENT DOCUMENTS

| 4,312,330 A | 1/1982 | Holdridge |
| 4,893,612 A | 1/1990 | Dawson |
| 5,656,209 A | 8/1997 | Benz et al. |
| 2002/0147477 A1 | 10/2002 | Pons et al. |

(Continued)

FOREIGN PATENT DOCUMENTS

| CN | 101697038 B | 4/2011 |
| CN | 104730602 A | 6/2015 |

(Continued)

OTHER PUBLICATIONS

GB Search Report for co-pending GB1911080.8, 2 pages, Feb. 12, 2020.

(Continued)

*Primary Examiner* — William R Alexander
(74) *Attorney, Agent, or Firm* — Kagan Binder, PLLC

(57) ABSTRACT

A planar non-imaging optical element (10) for a solar concentrator is described. Groups of circular and concentrically arranged microstructures (35) are arranged to refract light incident normal to the plane (504) of the optical element (10) towards the centre point (502). The angle of the microstructures (35) with respect to the plane (504) of the optical element (10) within each group increases with increasing radial distance from the centre point (502) and are selected such that upon normally incident light (60) they to form a focal area common to all of the groups at a focal plane (506) of the optical element (10) and further selected such that the light refracted from the smallest radial distance from the centre point (502) within a given group and the light refracted from the largest radial distance from the centre point (502) within a given group cross at a plane (518) closer to the optical element (10) than is the focal plane (506).

16 Claims, 16 Drawing Sheets

(51) Int. Cl.
*F24S 23/30* (2018.01)
*G02B 5/04* (2006.01)

(58) Field of Classification Search
USPC .......................................................... 359/742
See application file for complete search history.

(56) References Cited

U.S. PATENT DOCUMENTS

| | | |
|---|---|---|
| 2007/0113883 A1 | 5/2007 | Rhee et al. |
| 2008/0041441 A1 | 2/2008 | Schwartzman |
| 2011/0011390 A1 | 1/2011 | Lafontaine et al. |
| 2011/0083664 A1* | 4/2011 | Todd ................. F24S 23/31 126/714 |
| 2011/0180143 A1 | 7/2011 | Nitz |
| 2011/0244187 A1 | 10/2011 | Rinko |
| 2012/0067418 A1 | 3/2012 | Hornung |
| 2012/0147477 A1 | 6/2012 | Chen et al. |
| 2012/0192919 A1 | 8/2012 | Mizuyama |
| 2013/0291929 A1* | 11/2013 | Numrich ............ G02B 19/0014 359/361 |
| 2013/0306127 A1 | 11/2013 | Ackermann et al. |
| 2015/0110970 A1 | 4/2015 | Peil et al. |
| 2015/0179856 A1* | 6/2015 | Abe .................. H01L 31/0543 359/361 |
| 2017/0123112 A1 | 5/2017 | Scarbrough et al. |
| 2019/0081195 A1* | 3/2019 | Pranov ............. G02B 19/0023 |
| 2021/0265945 A1* | 8/2021 | Teng ................. G02B 6/4201 |
| 2021/0402721 A1* | 12/2021 | Pranov ................. C03C 15/00 |

FOREIGN PATENT DOCUMENTS

| | | | |
|---|---|---|---|
| DE | 2840094 A1 | 3/1980 | |
| DE | 32 48512 A1 * | 7/1984 | ............... G02B 3/08 |
| EP | 0173344 A2 | 3/1986 | |
| EP | 1521044 A2 | 4/2005 | |
| EP | 1892076 A1 | 2/2008 | |
| EP | 2477051 A1 | 7/2012 | |
| EP | 2863245 A1 | 4/2015 | |
| EP | 2603822 B1 | 2/2018 | |
| JP | 54121149 A | 9/1979 | |
| JP | 0792309 A | 7/1995 | |
| WO | 2008153435 A1 | 12/2008 | |
| WO | 2011080508 A2 | 7/2011 | |
| WO | 2012073604 A1 | 6/2012 | |
| WO | 2015101626 A1 | 7/2015 | |
| WO | 2017009625 A1 | 1/2017 | |
| WO | 2017149095 A1 | 9/2017 | |

OTHER PUBLICATIONS

Eduardo Lorenzo Pigueiras et al., "Hybrid Silicone-Glass Fresnel Lens as Concentrator for Photovoltaic Applications", Electric Power Research Institute (Report) EPRI EA vol. 1, 10.1007/978-94-009-9487-4_116, Jan. 1, 1979, pp. 536-539.

International Search Report for co-pending PCT/EP2020/071746, 3 pages, Oct. 23, 2020.

* cited by examiner

SAFETY LENS

CROSS-REFERENCE TO RELATED APPLICATIONS

This application claims benefit from International Application No. PCT/EP2020/071746, filed 1 Aug. 2020, which in turn claims priority from GB1911080.8, filed 2 Aug. 2019, the contents of which are hereby incorporated herein by reference in their respective entireties for all purposes The invention addresses the problem of unwanted foci generated by an optical element in a solar concentrator when sunlight is incident upon it non-normal to the plane of the optical element. Such unwanted foci may cause undesired heating, and even combustion, in the vicinity of the unwanted foci.

It is conventional to use Fresnel lenses, particularly non-imaging Fresnel lenses, in solar concentrators, as these are thinner, lighter and less expensive to produce than standard lenses. An imaging Fresnel lens has a structure in which the angle of deflection increases continuously with the radius of the lens, as shown in FIG. 1, smooth line; the lens itself has facets whose surface is curved, in a way that reflects the curvature of a conventional lens having the same diffractive power. A non-imaging Fresnel lens conventionally used as an optical element in a solar concentrator has a structure in which each facet of the lens has a fixed constant angle (linear sawtooth cross section), which results in the angle of deflection increasing in a stepped manner, as shown in FIG. 1, stepped line, and thus defocuses the light slightly compared with the ideal structure, providing a focal area at the centre of focus of the lens, rather than the focal point obtained by an ideal imaging Fresnel lens. For the purposes of solar concentrators, this latter structure is preferable, as it provides the focused light in an even distribution over the surface of the receiver, rather than producing one spot of very high intensity in one part of the receiver.

FIG. 2 shows the focusing of normal-incident light 501A and non-normal incident light 501B by an imaging Fresnel lens (centre of lens shown as 502 and plane of lens show as 504). On the left can be seen the normal incident light, and on the right the non-normal incident light. The angle of deflection 560 resulting from the microstructures increases continuously with the distance r from the centre of the lens 502, as shown in FIG. 5, smooth line 560; this is achieved by use of a Fresnel angle that increases continuously as a function of the radius of the lens, as shown in FIG. 6 smooth line 580.

FIG. 3 shows the focusing of normal-incident light 501A and non-normal incident light 501B by a non-imaging Fresnel lens, as often used in solar concentrators. On the left can be seen the normal incident light, and on the right the non-normal incident light. The angle of deflection resulting from the microstructures is constant for each facet of the lens, and the angle of deflection is greater for each facet as the distance r of the facet from the centre of the lens increases. FIG. 1, stepped line 565, shows a typical variation for the Fresnel angle for such a lens; it can be seen that the Fresnel angle is equal to the ideal Fresnel angle 555 at the part of the facet that is closest to the centre of the lens (smallest r for that facet), and, as the Fresnel angle for the facet is constant, there is increasing deviation from the ideal as r increases for each facet.

In US2011/0083664, it is recognised that the concentration of solar radiation using Fresnel lenses causes "hot spots" that can cause problems in some applications where intensely concentrated energy could damage the target, such as a photovoltaic device. This of course is in relation to the intended focus or foci of the Fresnel lens. It is also recognised in this document that sharp focal areas are not preferred in lenses for home use, as they can constitute a fire hazard if improperly used. The authors of the document therefore propose a technique they describe as "Fresnel shifting", in which incident light is redirected using a Fresnel structure, but the light rays are maintained in a parallel relationship to one another, and are not focused on to a target. Different angles of "Fresnel shifting" can be applied to areas at a different radial distance from a target, such that the light incident over a wide area can be shifted such that it all impinges on the same target area, without any of the structures through which the light passes functioning to focus the light. The behaviour of non-normal incident light is not considered by the authors of this document.

In WO2011/080508, the need for a solar energy collector to take account of the different angles of incidence of light throughout the day, in particular for roof-mounted solar panels, is addressed. Instead of a conventional heliostat, the inventors propose the use of a collection film which has thereon different regions each of which has lenses arranged to direct light from a given different range of angles of incidence on to the receivers. The film can be scrolled with respect to the receivers such that the appropriate region of the film is positioned above the receivers at any given time of day to direct the incident light on to the receivers. That the design of the lenses can be adjusted to reduce scattering of light rays from edges and to reduce aberrations associated with off axis rays is mentioned, but no explanation of how this might be done is included in the document.

In US2012/0192919, optical elements are described that are suitable for use in focusing light onto a solar photovoltaic array. The optical elements combine Fresnel lens structures, which Fresnel lens structures are selected to cancel out the chromatic dispersion of the optical element in order to obtain high diffraction efficiency across a range of wavelengths, on a convex surface of a substrate, with a microlens array on the other, planar, face of the substrate, to create a focal area at the photovoltaic device. It is taught that to use a lens of this form produces a focal area with uniform light intensity across that area. Only the behaviour of incident light normal to the plane of the optical element is considered. The complex double lens structure is likely to give rise to unpredictable deflection and focussing of light for light that is non-normal to the plane of the optical element, as well as leading to thicker, more difficult to manufacture optical elements.

EP1521044 relates to a Fresnel lens for a solar concentrator where the Fresnel angle at larger radii produces a shorter focal length. This aims to achieve uniformity in distribution of polychromatic irradiance on the plane of the cell. EP0173344 relates to a light focussing lens for collecting solar. The lens is arranged to separate and focus only light component of a desired wave length. The central part of the Fresnel lens blocks light, such that only the circumferential part performs a lens function. Different wavelengths are focussed at different planes. CN101697038 relates to a spectrum conversion device to improve PV cell efficiency. This uses prism like elements to separate the solar light into colour components, which are focussed on the surface of corresponding target devices according to colour.

The present inventors have realised that, where non-normal light is incident on an imaging Fresnel lens, each group of microstructures of the lens will deflect the light to result in a focal point 508 in the focal plane 506, which focal point will not coincide with the desired focal point 510 of the lens (usually a receiver), as depicted in FIG. 2. The incidence of non-normal light on to an optical element is a particular problem for optical elements used in solar concentrators, which have a typical area of optical elements of 16 m², and which may be exposed to high winds, such as 15-20 m/s. Such exposure can cause distortion of the optical elements, and/or cause the angle of the solar concentrator with respect to the incident sunlight to deviate from the ideal, such that the plane of the solar concentrator is not consistently normal to the incident sunlight. The resulting foci that do not coincide with the desired focal point of the lens cause local heating of whatever is situated at the focal point; this may be vegetation, or parts of the solar collector other than the receiver, for example, and these may be damaged or ignited by the heating resulting from the unwanted foci. While this problem can be mitigated to some extent by the use of a non-imaging lens, this still results in the formation of focal areas in unwanted positions which receive focused solar energy, as shown in FIG. 3. For example, the inventors have noted the melting and burning of the outer plastic shell of a control box of a solar collector situated at such an unwanted focal area (see FIG. 4). It would be desirable to avoid such damage and fire hazards in the design of optical elements for solar concentrators.

Accordingly, the present inventors have devised an optical element which aims to reduce the risk of damage and/or fire hazard associated with non-normal incident light passing through a solar concentrator.

In order to achieve this, the present inventors have established a structure for the microstructures of a non-imaging optical element which allow the optical element to continue to focus light incident normal to the plane of the element to a desired focal area (such as on to a receiver of a solar concentrator), but which also diffuses the foci resulting from non-normal incident light so as to reduce heating caused by non-normal incident light passing through the lens. This result is achieved by alteration of the change in the angle of deflection of the microstructures of the optical element, and, in particular, alteration of the rate of change of the angle of deflection with increasing radius of the optical element, compared with conventional imaging and non-imaging Fresnel lenses.

In a first aspect, the invention provides a planar non-imaging optical element for a solar concentrator comprising a plurality of groups of circular and concentrically arranged microstructures around a centre point, which microstructures are arranged to refract light incident normal to the plane of the solar concentrator towards the centre point, wherein: the angle of the microstructures with respect to the plane of the optical element within each group increases with increasing radial distance from the centre point;
the angles of the microstructures with respect to the plane of the optical element of each of the individual groups are selected such as to form a focal area common to all of the groups at a focal plane of the optical element, when illuminated by light incident normal to the plane of the optical element; and
the angles of the microstructures with respect to the plane of the optical element of each of the individual groups are selected such that, when illuminated by light incident normal to the plane of the optical element, the light refracted from the smallest radial distance from the centre point within a given group and the light refracted from the largest radial distance from the centre point within a given group cross at a plane closer to the optical element than is the focal plane.

Thus, in the context of a solar concentrator, light that misses the solar receiver/collector due to it being non-normally incident on the lens typically then has further to travel before create unwanted focal areas on the structure in the background, e.g. the ground or support structure, and so the light diverges, creating less intense focal areas on the background structure. Thus, there is less risk of fire or damage.

A plane closer to the optical element than is the focal plane means a plane lying between the plane of the optical element and the focal plane.

Preferably, the common focal area includes, or surrounds, a centre of focus which is the projection of the centre point of the lens normal to the plane of the optical element on to the focal plane. Preferably, the focal area is centred on the centre of focus. In certain embodiments, it is preferred for the focal area to exclude the centre of focus, while surrounding it.

Preferably, the optical element is in the form of a Fresnel lens. Preferably, the microstructures are Fresnel microstructures.

Preferably, the angle of the microstructures with respect to the plane of the optical element within each group increases linearly with increasing radial distance from the centre point.

Preferably, the microstructures are in the form of linear sawtooth gratings. That is to say, each group of microstructures has a constant rate of increase of angle with respect to the plane of the lens (prism angle or Fresnel angle), and between each group of microstructures there is a stepwise discontinuity which is normal to the plane of the lens.

The planar optical element of the invention preferably does not have a macroscopically convex geometry on either surface, nor does it comprise additional structures such as microlenses on either surface. Thus, the optical element of the invention provides a simply constructed and light weight optical element which can be manufactured at low cost, such as by roll-to-roll processing methods and using polymer films.

The radial width of each group of microstructures is preferably equal. However, the skilled person will recognize that it is possible to provide coincident focal areas for groups of microstructures whose radial widths are not equal to one another.

Preferably, the point at which the refracted light from the smallest radial distance from the centre point of the optical element within a given group crosses the focal plane and the point at which the refracted light from the largest radial distance from the centre point of the optical element within a given group crosses the focal plane are further apart than the distance between the smallest radial distance from the centre point and the largest radial distance from the centre point of the optical element within that group. This increases the degree of divergence of light refracted from each group, and thus decreases the risk of formation of unwanted focal spots, as these cannot be formed closer to the optical element than the plane at which the light refracted from the smallest radial distance from the centre point within a given group and the light refracted from the largest radial distance from the centre point within a given group cross.

Preferably, the plane at which the refracted light from the smallest radial distance from the centre point of the optical element within a given group crosses the refracted light from the largest radial distance from the centre point of the optical element within the same group is closer to the plane of the optical element than X times the focal distance of the optical element, where X is smaller than 1, preferably smaller than 0.9, more preferably smaller than 0.8, yet more preferably smaller than 0.7, such as smaller than 0.6, more preferably smaller than 0.5, yet more preferably smaller than 0.4, such as smaller than 0.3, more preferably smaller than 0.2, yet more preferably smaller than 0.1. The focal distance of the optical element is the distance, measured normal to the plane of the optical element, between the optical element and the focal plane. Again, the smaller X is, the greater the divergence of the refracted light within each group, and the less the risk of formation of unwanted focal spots capable of intense heating.

Preferably, the common focal area for at least some of the groups of microstructures surrounds, but does not include, the centre of focus and a surrounding area having a radius calculated as the product of the distance between the plane of the optical element and the focal plane measured normal to the plane of the optical element, and the tangent of 0.275°. This allows a more even distribution of light across the focal area to be achieved.

In one embodiment of the first aspect of the invention is provided a planar non-imaging optical element for a solar concentrator comprising a plurality of groups of circular and concentrically arranged microstructures around a centre point, which microstructures are arranged to refract light incident normal to the plane of the solar concentrator towards the centre point, wherein:
the angle of the microstructures with respect to the plane of the optical element within each group increases with increasing radial distance from the centre point;
the angles of the microstructures with respect to the plane of the optical element of each of the individual groups are selected such as to form a focal area common to all of the groups at a focal plane of the optical element, when illuminated by light incident normal to the plane of the optical element; and
the angles of the microstructures with respect to the plane of the optical element of each of the individual groups are selected such that, when illuminated by light incident normal to the plane of the optical element, the light incident on each group of microstructures is focused such that a separate annular focal line is formed for each group in a group focus plane for the optical element which lies between the plane of the optical element and the focus plane.

Preferably, the angle of the microstructures with respect to the plane of the optical element within each group increases linearly with increasing radial distance from the centre point.

Preferably, the microstructures are in the form of linear sawtooth gratings. That is to say, each group of microstructures has a constant rate of increase of angle with respect to the plane of the lens (prism angle or Fresnel angle), and between each group of microstructures there is a stepwise discontinuity which is normal to the plane of the lens.

Preferably, the group focus plane, ie the plane at which light refracted from the different radial distances from the centre point within the same group crosses, is closer to the plane of the optical element than to the focal plane. Preferably, the group focus plane is closer to the plane of the optical element than X times the focal distance of the optical element, where X is smaller than 1, preferably smaller than 0.9, more preferably smaller than 0.8, yet more preferably smaller than 0.7, such as smaller than 0.6, more preferably smaller than 0.5, yet more preferably smaller than 0.4, such as smaller than 0.3, more preferably smaller than 0.2, yet more preferably smaller than 0.1. The focal distance of the optical element is the distance, measured normal to the plane of the optical element, between the optical element and the focal plane. Again, the closer the group focus plane is to the optical element, the greater the divergence of the refracted light within each group, and the less the risk of formation of unwanted focal spots capable of intense heating.

Preferably, for each group of microstructures spanning a radial distance r to r+2x, the angle of the microstructures is equal to the angle required to refract light to the centre of focus at the focal plane at a radial distance of r+x. However, it is possible also for the angle of the microstructures to equal the angle required to refract light to the centre of focus at the focal plane at a radial distance of r, or at a radial distance of r+2x or at any other intermediate point within the range r to r+2x. This last arrangement is less preferred as, when the normally incident light on the optical element is refracted by all of the groups of microstructures, it will result in an uneven distribution of focused light across the focal area, which, in the context of solar concentrators, will result in an uneven transfer of energy to the receiver present at the focal area. This is less efficient, therefore, than the preferred arrangement, in which the centre of the focal area for each group coincides with the centre of focus of the optical element.

In another embodiment of the first aspect of the invention is provided a planar non-imaging optical element for a solar concentrator comprising a plurality of groups of circular and concentrically arranged microstructures around a centre point, which microstructures are arranged to refract light incident normal to the plane of the solar concentrator towards the centre point, wherein:
the angle of the microstructures with respect to the plane of the optical element within each group increases with increasing radial distance from the centre point;
the angles of the microstructures with respect to the plane of the optical element of each of the individual groups are selected such as to form a focal area common to all of the groups at a focal plane of the optical element, when illuminated by light incident normal to the plane of the optical element; and
the angles of the microstructures with respect to the plane of the optical element of each of the individual groups are selected such that, when illuminated by light incident normal to the plane of the optical element, the light refracted from the smallest radial distance from the centre point within a given group and the light refracted from the largest radial distance from the centre point within a given group cross at a plane closer to the optical element than is the focal plane;
wherein at least one of the groups of microstructures is divided into a subgroup of smaller radius and a subgroup of larger radius by a discontinuity in the gradient of the angles of the microstructures such that none of the microstructures of either subgroup refract normally incident light to be incident upon the centre of focus at the focal plane.

Preferably, none of the microstructures of either subgroup refract normally-incident light to be incident upon an area surrounding the centre of focus at the focal plane having a radius calculated as the perpendicular distance between the optical element and the focal plane×tan 0.275°.

Preferably, within the each subgroup, the angle of deflection at the smallest radius and at the largest radius within each subgroup cause light incident at each of these radii to cross at a plane closer to the optical element than is the focal plane.

Preferably, the angles of deflection of the microstructures of the subgroup of smaller radius refract normally-incident light such that it crosses a line joining the centre point of the optical element to the centre of focus before it is incident upon the focal plane, and the angles of deflection of the microstructures of the subgroup of larger radius refract normally-incident light such that it does not cross a line joining the centre point of the optical element to the centre of focus before it is incident upon the focal plane.

Preferably, the angle of the microstructures with respect to the plane of the optical element within each subgroup increases linearly with increasing radial distance from the centre point.

Preferably, the microstructures are in the form of linear sawtooth gratings. That is to say, each subgroup of microstructures has a constant rate of increase of angle with respect to the plane of the lens (prism angle or Fresnel angle), and between each group of microstructures and subgroup of microstructures there is a stepwise discontinuity which is normal to the plane of the lens.

Preferably, the optical element of the first aspect of the invention further comprises:
a light transmissive substrate, and
a light transmissive focusing polymer foil which comprises a layer of switchable adhesive, wherein the layer of switchable adhesive adheres the focusing polymer foil to the substrate, and wherein the focusing polymer foil comprises the plurality of groups of concentric and circularly arranged microstructures. As described in WO 2017/149095, such an arrangement allows low cost production of focusing foil, using roll-to-roll processing, and replacement of the polymer film when it has been deteriorated by exposure to environmental conditions.

Preferably, the focusing polymer foil is flexible, more preferably capable of being rolled. Suitably, the focusing polymer foil further comprises a UV stabilizer. However, in certain embodiments, it is preferred that the focusing polymer foil does not comprise a UV stabiliser. Preferably, the thickness of the said focusing polymer foil is less than 200 µm, more preferably less than 100 µm, even more preferably less than 50 µm and most preferably less than 30 µm. In some embodiments, it is advantageous to form an antireflective coating on the focusing polymer foil. Preferably, the switchable adhesive is one whose adhesion may be reduced by application of heat, a solvent, pressure or delaminating force, or a combination thereof. Preferably, the layer of switchable adhesive consists of a thermoplastic adhesive, and means for switching is heating of the optical element to at least 80° C.

Alternatively and preferably, the optical element further comprises:
a light-transmissive glass substrate having a front surface on which the electromagnetic radiation is incident in use and a back surface opposite to the front surface; and
a light-transmissive silicone coating on the back and/or the front surface of the substrate;
wherein the silicone coating has formed thereon the plurality of groups of concentric and circularly arranged microstructures, and
wherein the surface(s) of the glass substrate on which the silicone coating is formed is/are roughened. As described in WO2020/120638, this arrangement avoids the use of adhesive to mount the microstructured layer to the substrate, and provides improved environmental and UV stability of the optical element.

No adhesive layer is provided between the silicone coating and the glass substrate. This reduces the cost and complexity of manufacture, and avoids possible UV light or water ingress induced degradation of an adhesive layer.

Preferably, a protective film is provided on the structured side of the silicone coating, ie that side of the silicone coating that is not in contact with the glass substrate. Suitably, the protective film is a thermoplastic film. Suitably, the protective film has formed thereon microstructures that are the inverse of the microstructures formed on the silicone coating, and which cooperate with the microstructures on the silicone coating.

Preferably, the light-transmissive silicone coating is formed from an outdoor use silicone. Suitably, the light-transmissive silicone coating is formed from a liquid silicone resin that is suitable for casting. Preferably, the silicone is of a type selected from the group consisting of polymerized siloxanes or polysiloxanes. Preferably, the silicone is selected from the group consisting of polydimethylsiloxanes (PDMS).

Preferably, the surface roughness of the surface(s) of the glass substrate on which the light-transmissive silicone coating is formed is in the form of nanostructures having a height of up to 800 nm, more preferably 600 nm, most preferably 400 nm. Preferably, the nanostructures have a height of 50 nm or more, preferably 100 nm or more, most preferably 200 nm or more. Preferably, the $R_z$ value for the roughened surface(s) is within the range of from 50 nm to 800 nm, more preferably from 100 nm to 600 nm, most preferably from 200 nm to 400 nm. Preferably, the structures have a width that is the same as their height. Suitable surface roughening can be provided by a refractive index gradient structure etched on the glass substrate. The surface roughness of a glass substrate that is not roughened according to the invention is typically less than 5 nm, for example having an $R_a$ value of less than 5 nm.

Preferably, the aspect ratio of the nanostructures is from 0.5 to 1.

Preferably, where only one surface of the glass substrate is coated with a light-transmissive silicone coating, the other surface of the glass substrate is provided with an antireflective coating or treatment. Preferably, the antireflective treatment is a refractive index gradient structure etched on the glass substrate.

Preferably, the glass is selected from borosilicate glass, low-iron glass, iron-free glass or float glass. It is particularly preferable to use low-iron glass or iron-free glass as the transmission of light therethrough is higher, thus increasing the efficiency of the optical element.

Preferably, the glass substrate has a size of at least 0.5 m in width and/or length, where the front and back surface of the substrate have a quadrilateral form. Preferably, the glass substrate has a minimum front surface area of 0.25 m². Preferably, the glass substrate has a width and/or length of at least 0.75 m. Preferably, the glass substrate has a minimum front surface area of 0.5625 m². Preferably, the glass substrate has a width and/or length of at least 1 m. Preferably, the glass substrate has a minimum front surface area of 1 m². For a substrate of 1 m×1 m width and length, a suitable thickness would be from 2 mm to 5 mm, such as 3 mm. Suitably, the glass substrate has a maximum area of 4 m², such as a width of 2 m and a length of 2 m. For a substrate of 2 m×2 m width and length, a suitable thickness would be from 6 mm to 10 mm, such as 8 mm.

In certain embodiments of the invention it is preferred that the back surface of the glass substrate is coated with the light-transmissive silicone coating. However, in other embodiments, it is preferred that the front surface of the glass substrate is coated with the light-transmissive silicone coating instead of or in addition to the back surface.

Suitably, the optical element may comprise a second light transmissive glass substrate, which may be placed in front of or behind (with reference to the intended direction of incident light) the first light transmissive glass substrate. Preferably, where the first light transmissive glass substrate is provided with a light transmissive silicone coating on the back surface, the second light transmissive glass substrate is placed behind the first light transmissive glass substrate. Preferably, where the first light transmissive glass substrate is provided with a light transmissive silicone coating on the front surface, the second light transmissive glass substrate is placed in front of the first light transmissive glass substrate. The second light transmissive glass substrate may be placed in contact with the first light transmissive glass substrate, or with the light transmissive silicone coating on the first light transmissive glass substrate. Alternatively, suitable spacers may be provided between the substrates to maintain the desired spacing between them. In either case, a suitable sealant may be used to isolate the spaces between the first and second light transmissive glass substrates from the ambient environment. Suitably, a dry gas, such as a dry inert gas, can be provided between the first and second light transmissive glass substrates. Suitably, the second light transmissive glass substrate is formed of the same materials and has the same size as described above for the first light transmissive glass substrate; preferably the first and second light transmissive substrates are formed from the same materials and have the same dimensions. Suitably, the second light transmissive glass substrate may have an antireflective coating on its front and/or the back face, which antireflective coating is preferably as described above for the first light transmissive glass substrate. Suitably, the second light transmissive glass substrate may further comprise a light transmissive silicone coating having microstructures formed thereon on, on the front and/or the back face of the second light transmissive glass substrate; preferably, the light transmissive silicone coating is as described above for the first light transmissive glass substrate. In a preferred embodiment, where the first light transmissive glass substrate is provided with a light transmissive silicone coating on the back surface, the second light transmissive glass substrate is placed behind the first light transmissive glass substrate and is provided with a light transmissive silicone coating on the front surface.

In a second aspect, the present invention provides a solar concentrator comprising an optical element according to the first aspect of the invention.

Suitably, the solar concentrator may comprise more than one optical element according to the invention, such as an array of optical elements. Suitably, each optical element may focus incident radiation on to an associated focal area.

Suitably, the solar concentrator further comprises one or more solar collectors, or receivers, positioned to receive the radiation passing through and focused by the optical elements. The one or more solar collectors are positioned within the focal area associated with each optical element comprised in the solar concentrator. Suitably, the solar collectors may each be selected from photovoltaic cells or a heat exchanger arranged to be heated by the incident solar radiation and to transfer that heat to a heat transfer fluid. Suitably, where the solar collector is a photovoltaic cell, the solar concentrator further comprises wiring and circuitry suitable to transfer the electrical energy produced by the photovoltaic cell to a suitable consumer of, or storage medium for, electrical energy, such as a domestic electrical circuit or a battery. Suitably, where the solar collector is a heat exchanger, the solar collector further comprises conduits suitable to convey the heat transfer fluid to a consumer of heat energy or a storage medium for heat energy, such as a steam generator, or a heat sink.

Preferably, the solar concentrator further comprises a support for the one or more optical elements. Preferably, the support holds the one or more optical elements in a desired orientation. Where more than one optical element is comprised in the solar concentrator, preferably the support holds the plurality of optical elements in a desired relationship to one another. Suitably, the plurality of optical elements may be held in a planar array. Preferably, the support is arranged such that the area of the one or more optical elements through which radiation may be transmitted and focused is maximized; for example, at least 90% of the area of each of the one or more optical elements is available to transmit and focus incident radiation. Suitably, the support may comprise two or more supporting beams extending in a mutually parallel direction, for example with their longitudinal axes aligned and spaced at regular intervals, and preferably with their proximal ends being aligned with one another and their distal ends being aligned with one another, such that the two or more supporting beams define a quadrilateral plane, such as a rectangular or square plane.

Preferably, the solar concentrator further comprises a mount which allows the position of the one or more optical elements with respect to the incident radiation to be adjusted, preferably to allow the one or more optical elements to be placed such that the incident radiation is orthogonal to the plane of the one or more optical elements. Suitably the mount may comprise a swivel joint. Where a support is included in the solar concentrator, the mount is suitably fixed to the support and allows the position of the support to be adjusted. Preferably, the mount further comprises a solar tracker that acts to adjust the position of the one or more optical elements with respect to the incident radiation to maintain the incident radiation orthogonal (or as near as practically possible to orthogonal) to the plane of the one or more optical elements during a period of two or more hours, such as three or more hours, four or more hours, six or more hours, such as eight or more hours, such as 12 or more hours.

In a third aspect, the present invention provides a method of reducing the risk of fire or heat damage caused by light incident non-normal to the plane of an optical element of a solar concentrator, in which a planar optical element according to the first aspect of the invention is substituted for a conventional planar optical element not according to the invention. The conventional planar optical element not according to the invention may be one having groups of microstructures whose deflection angle is fixed across the radial width of each group, such as is depicted in FIG. 1, stepped line, or may be an imaging Fresnel lens, such as depicted in FIG. 1, smooth line.

In a fourth aspect, the present invention provides a method of manufacture of an optical element according to the first aspect of the invention, the method comprising
  (a) providing a substrate;
  (b) forming a microstructured layer on the substrate wherein the microstructures of the microstructured layer are the plurality of groups of circular and concentrically arranged microstructures of the optical element of the first aspect of the invention.

Preferably, as described in WO2020/120638, the method comprises the steps of:
  (a) providing a first light-transmissive glass substrate having a front surface on which the electromagnetic radiation is incident in use and a back surface opposite to the front surface;
  (b) applying a liquid silicone resin to the back and/or the front surface of the glass substrate;

(c) contacting the liquid silicone resin with a mould such that the liquid silicone resin adopts the form of the mould and forms the microstructured layer extending over the surface(s) of the glass substrate to which the liquid silicone resin has been applied;

(d) curing the liquid silicone resin to form a microstructured light-transmissive silicone layer;

wherein the surface(s) of the glass substrate to which the liquid silicone resin is to be applied is/are roughened.

Preferably, the surface roughness of the surface(s) of the glass substrate to which the liquid silicone resin is to be applied is in the form of nanostructures having a height of up to 800 nm, more preferably 600 nm, most preferably 400 nm. Preferably, the nanostructures have a height of 50 nm or more, preferably 100 nm or more, most preferably 200 nm or more. Preferably, the $R_z$ value for the roughened surface is within the range of from 50 nm to 800 nm, more preferably from 100 nm to 600 nm, most preferably from 200 nm to 400 nm. Preferably, the structures have a width that is the same as their height. Suitable surface roughening can be provided by a refractive index gradient structure etched on the glass substrate.

Preferably, following step (a) and before step (b) the method further comprises the step of forming nanostructures on the surface(s) of the glass substrate to which the liquid silicone resin is to be applied. Preferably, the surface roughness of the surface(s) of the glass substrate to which the liquid silicone resin is to be applied is in the form of nanostructures having a height of up to 800 nm, more preferably 600 nm, most preferably 400 nm. Preferably, the nanostructures have a height of 50 nm or more, preferably 100 nm or more, most preferably 200 nm or more. Preferably, the nanostructuring step comprises etching a refractive index gradient structure on the surface(s) of the glass substrate to which the liquid silicone resin is to be applied. Suitably, the etching is a plasma etching step.

Preferably, where only one of the surfaces of the glass substrate is to be coated with liquid silicone resin, the other surface of the glass substrate is provided with an antireflective coating or treatment. Suitably, following step (a) and before step (b), the method further comprises the step of applying an antireflective coating or antireflective treatment to this surface of the glass substrate.

Preferably, the glass substrate has a size of at least 0.5 m in width and/or length, where the front and back surface of the substrate have a quadrilateral form. Preferably, the glass substrate has a minimum front surface area of 0.25 m². Preferably, the glass substrate has a width and/or length of at least 0.75 m. Preferably, the glass substrate has a minimum front surface area of 0.5625 m². Preferably, the glass substrate has a width and/or length of at least 1 m. Preferably, the glass substrate has a minimum front surface area of 1 m². For a substrate of 1 m×1 m width and length, a suitable thickness would be from 2 mm to 5 mm, such as 3 mm. Suitably, the glass substrate has a maximum area of 4 m², such as a width of 2 m and a length of 2 m. For a substrate of 2 m×2 m width and length, a suitable thickness would be from 6 mm to 10 mm, such as 8 mm. Preferably, the glass substrate is planar, within manufacturing tolerances; a deviation from non-planarity of 0.5 to 5 degrees is acceptable in use in a solar concentrator.

Suitably, in step (b), the application of the liquid silicone resin is carried out by any suitable method known in the art for providing a layer of a liquid on a surface. For example, spin coating (if the substrate size allows) or knife coating can be used. Preferably, however, one or more droplets, pools or areas of liquid silicone resin is applied to the surface without any active spreading of the one or more droplets, pools or areas into a continuous layer during the application step (b).

Suitably, in step (c), the mould may take any suitable form or be made of any suitable material capable of forming the liquid silicone resin into the microstructured layer extending over the chosen surface(s) of the glass substrate. For example, the mould may be a stamp or a structured roller. The mould may be of plastics material, metal, glass or ceramic, and may be flexible or rigid.

Preferably, the mould is a thermoplastic film, one surface of which has formed thereon microstructures that are the inverse of the microstructures that, when adopted by the liquid silicone resin, form the microstructured layer. Preferably, the thermoplastic film is flexible, for example such that it may be peeled from the surface of the silicone coating after curing. Particularly preferably, the thermoplastic film may be selected from polypropylene film and polyethylene film. Preferably, the thickness of the thermoplastic film may be from 40 μm to 200 μm. Preferably, the thermoplastic film has a width and length that is greater than or equal to that of the glass substrate used. Preferably, the mould further comprises a carrier foil on which the thermoplastic film is supported.

Preferably, in step (c), the contacting of the liquid silicone resin with the mould comprises pressing the thermoplastic film surface on which the microstructures are formed against the liquid silicone resin in order that the liquid silicone resin adopts the form of the microstructures. Preferably, pressing the thermoplastic film against the liquid silicone resin is carried out using a roller. Preferably, the pressing of the thermoplastic film against the liquid silicone resin also spreads the liquid silicone resin, particularly where the liquid silicone resin was applied in step (b) as one or more droplets, pools or areas of liquid silicone resin on the surface of the substrate, to form a continuous coating extending over the chosen surface(s) of the glass substrate.

Preferably, in step (d), the curing is carried out using a combination of temperature and time. For example, depending on the selected liquid silicone resin, the curing conditions may be 24 hours at ambient temperature, such as at 20° C., 10 hours at 40° C., or 1 hour at 70° C. It will be understood by the skilled person that a balance between the temperature of curing and the time of curing can be found for a given resin depending on the process requirements; for example, the availability of suitable heating apparatus or the time available for curing. Preferably, the curing does not comprise the use of UV radiation to initiate the curing process.

Suitably, following the curing step (d), and where the mould is in the form of a stamp, a thermoplastic film, or other suitable form, the mould may be left in place on the cured light-transmissive silicone coating to act as a protective layer for the coating prior to its use as an optical element. This is particularly preferable where the mould is a thermoplastic film, or a thermoplastic film supported on a carrier foil, as described above.

Suitably, the method comprises the further step of:

(e) removing the mould from the microstructured light-transmissive silicone layer or coating.

Preferably, the removal step (e), where the mould is a thermoplastic film as described above, comprises peeling of the thermoplastic film from the silicone coating.

Alternatively and preferably, and as described in WO 2017/149095, the method comprises the steps of:
(a) providing a light-transmissive substrate;
(b) providing a light-transmissive focusing polymer foil comprising a layer of switchable adhesive, wherein the focusing polymer foil comprises the microstructured layer;
(c) applying the switchable adhesive layer to the substrate such that the focusing polymer foil is adhered to the substrate by the layer of switchable adhesive.

The method may further comprise the manufacture of the focusing polymer foil, in which case at least the following steps are carried out prior to steps (a) to (c) above:
forming a polymer film melt;
laminating the polymer film melt to a carrier foil while applying structuring to the polymer film melt in the form of the groups of circular and concentrically-arranged microstructures of the optical element of the first aspect of the invention;
applying a layer of switchable adhesive to the structured polymer film.

In a fifth aspect, the present invention provides a method of manufacture of a solar concentrator, comprising the steps of:
(i) providing one or more optical elements for a solar concentrator, the one or more optical elements comprising a plurality of groups of circular and concentrically arranged microstructures around a centre point, which microstructures are arranged to refract light incident normal to the plane of the solar concentrator towards the centre point, wherein:
the angle of the microstructures with respect to the plane of the optical element within each group increases with increasing radial distance from the centre point;
the angles of the microstructures with respect to the plane of the optical element of each of the individual groups are selected such as to form a focal area common to all of the groups at a focal plane of the optical element, when illuminated by light incident normal to the plane of the optical element; and
the angles of the microstructures with respect to the plane of the optical element of each of the individual groups are selected such that, when illuminated by light incident normal to the plane of the optical element, the light refracted from the smallest radial distance from the centre point within a given group and the light refracted from the largest radial distance within a given group cross at a plane closer to the optical element than is the focal plane;
(ii) arranging the one or more optical elements each to focus solar radiation on to a focal area;
(iii) placing a collector of solar energy at the or each focal area.

Preferably, the one or more optical elements are each according to the first aspect of the invention. Preferably, the solar concentrator is according to the second aspect of the invention. Preferably, the method further comprises manufacture of the one or more optical elements according to the fourth aspect of the invention. Where the optical element according to the first aspect of the invention is used and comprises a protective film on the structured side of the light-transmissive silicone coating, the method preferably further comprises the step of removing the protective film prior to step ii).

In a sixth aspect, the present invention provides a mould for use in the manufacture of an optical element according to the fourth aspect of the invention, wherein the optical element comprises:
a light-transmissive glass substrate having a front surface on which the electromagnetic radiation is incident in use and a back surface opposite to the front surface; and
a light-transmissive silicone coating on the back and/or the front surface of the substrate; wherein the silicone coating has formed thereon the plurality of groups of concentric and circularly arranged microstructures of the optical element of the first aspect of the invention, and
wherein the surface(s) of the glass substrate on which the silicone coating is formed is/are roughened;
in which the mould is for shaping a liquid silicone resin on a glass substrate, and wherein the mould is a thermoplastic film, one surface of which has formed thereon microstructures that are the inverse of the microstructures that, when adopted by the silicone coating, provide the plurality of groups of concentric and circularly arranged microstructures.

In a seventh aspect, the present invention provides a method of manufacture of a mould of the sixth aspect of the invention, the method comprising the steps of:
(i) providing a rotating extrusion coating roller for a polymer extrusion coating process using a thermoplastic material, which extrusion coating roller has the microstructures formed on its surface;
(ii) maintaining the temperature of the rotating extrusion coating roller below the solidification temperature of the thermoplastic material;
(iii) moving a carrier foil between the rotating extrusion coating roller and a rotating counter pressure roller at a given velocity corresponding to the rotational velocity of the rotating extrusion coating roller
(iv) continuously applying a melt of the thermoplastic material between the moving carrier foil and the rotating extrusion coating roller, whereby said thermoplastic melt is solidified upon contact with said extrusion coating roller, thereby forming a solid microstructured thermoplastic coating on said carrier foil, which coating has formed thereon microstructures that are the inverse of the microstructures that provide the plurality of groups of concentric and circularly arranged microstructures of the optical element of the first aspect of the invention.

In an eighth aspect, the present invention provides the use of an optical element of the first aspect of the invention, or a solar concentrator of the second aspect of the invention, in a solar energy plant. Preferably, the use is in improving the safety of a solar energy plant, by replacement of a conventional optical element of the prior art, such as an imaging Fresnel lens or a non-imaging Fresnel lens, with an optical element according to the first aspect of the invention, or by replacement of a solar concentrator comprising conventional optical elements of the prior art with a solar concentrator according to the second aspect of the invention.

In other aspects, the optical element be used for other applications than for a solar concentrator where it is desired to safely focus light, either imaging or not imaging, and where the microstructures are arranged as described above to produce group focal plane or planes between the lens plane and the imaging plane, such that the light diverges as it crosses the focal plane.

All features described in connection with any aspect of the invention can be used with any other aspect of the invention, insofar as they are not mutually incompatible.

Figure 3:
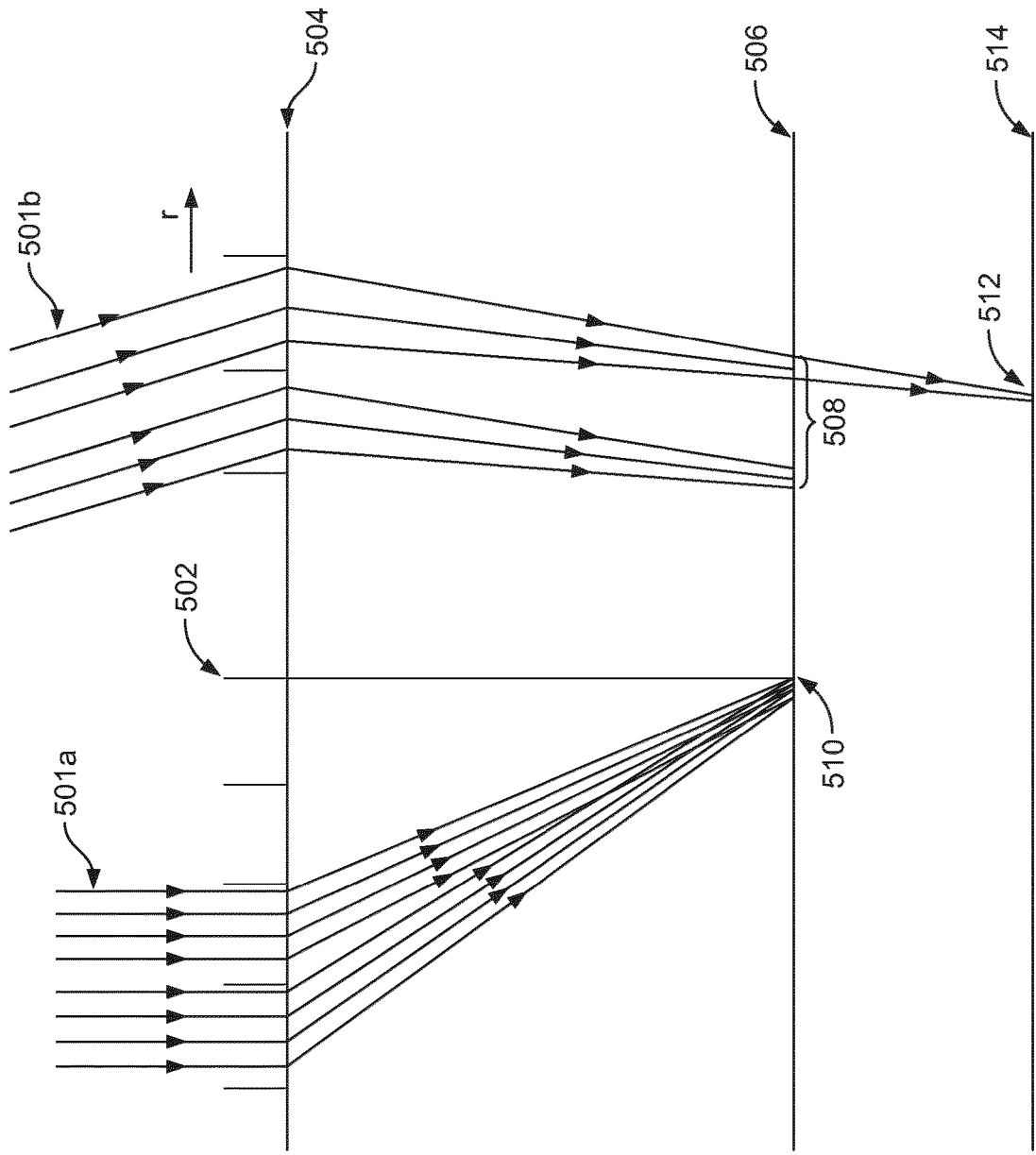
FIG. 3 shows a diagrammatic representation of the behaviour of light incident on a non-imaging Fresnel lens.
Figure 4:
FIG. 4 shows a photograph of the outer plastic shell of a control box of a solar collector, which has been melted and burned as a result of an unwanted focal point being incident upon it, which unwanted focal point was generated by sunlight incident upon a prior art solar collector non-normal to the plane of the collector.
Figure 7:
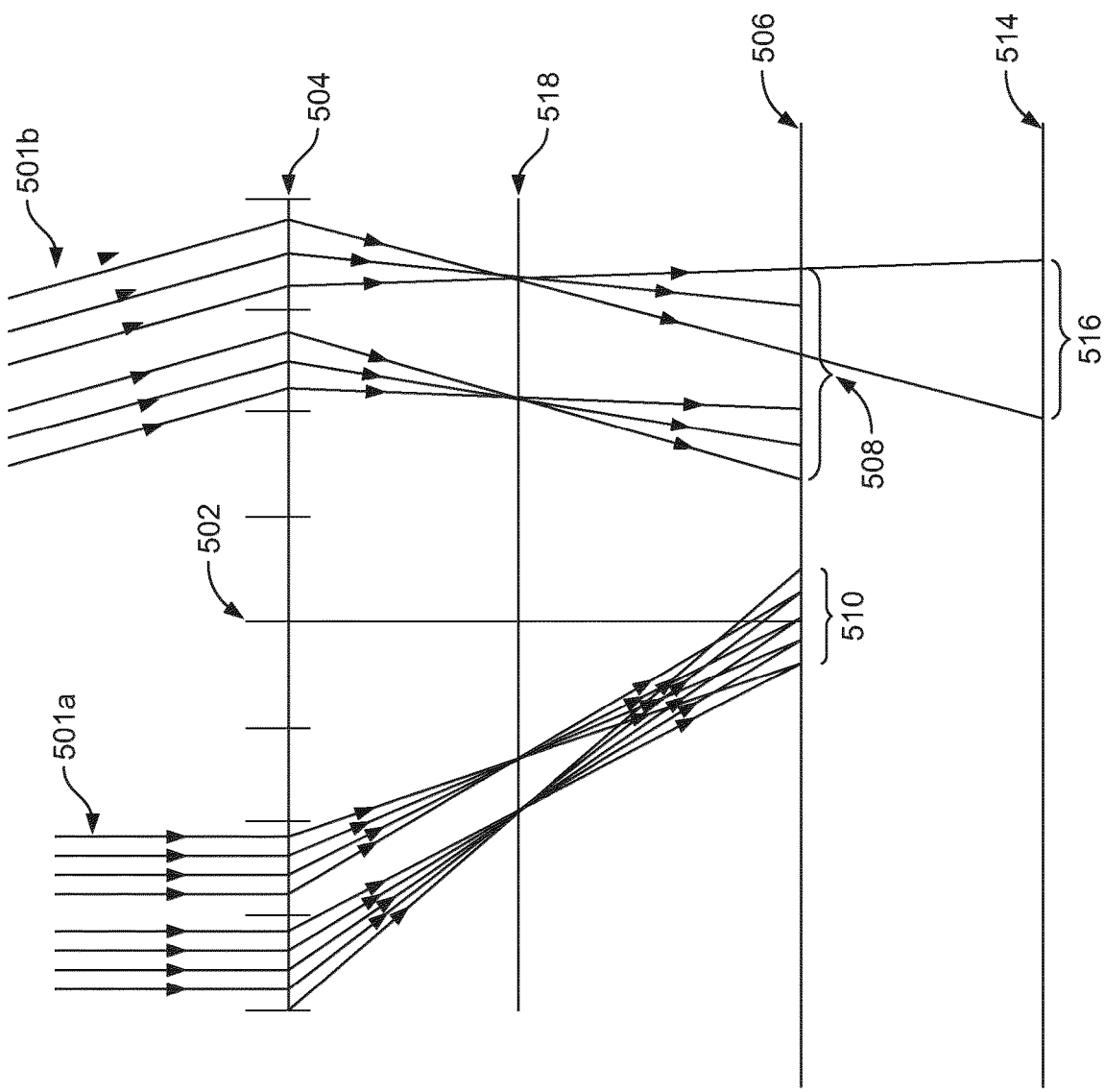
FIG. 7 shows a diagrammatic representation of the behaviour of light incident on a planar optical element according to a preferred embodiment of the invention.
Figure 9:
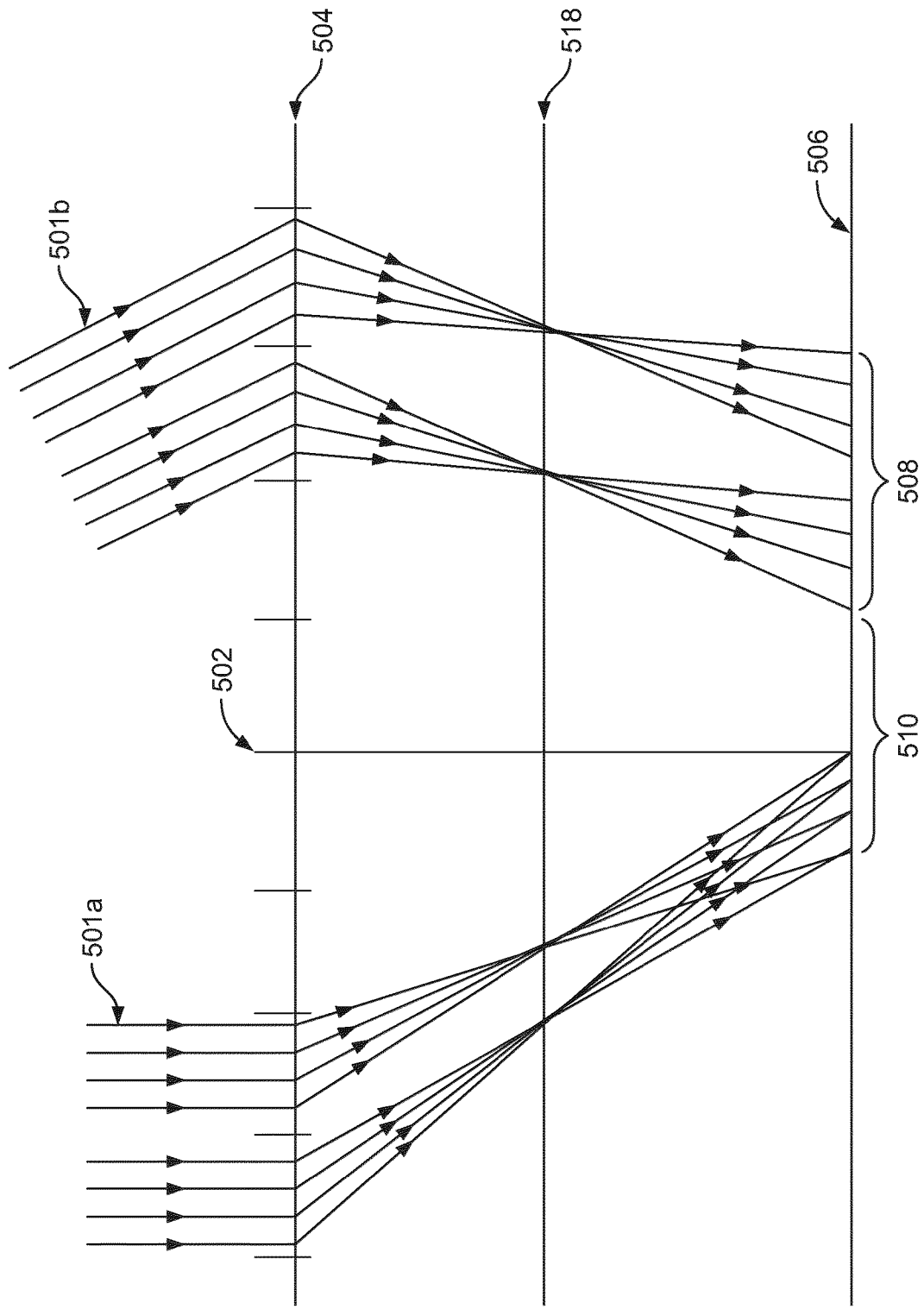
FIG. 9 shows a diagrammatic representation of the behaviour of light incident on a planar optical element according to an alternative embodiment of the invention.
Figure 10:
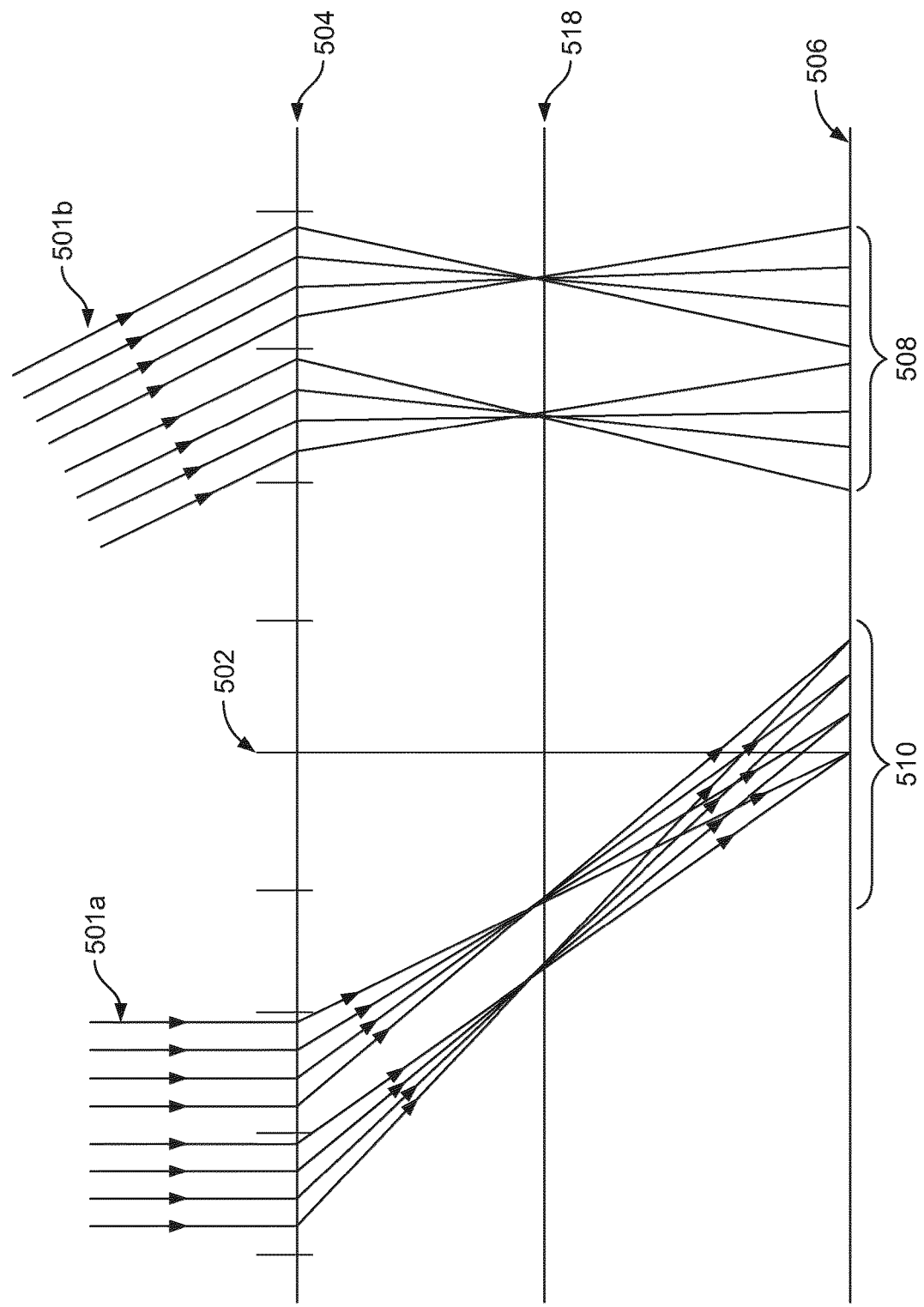
FIG. 10 shows a diagrammatic representation of the behaviour of light incident on a planar optical element according to a further alternative embodiment of the invention.
Figure 16:
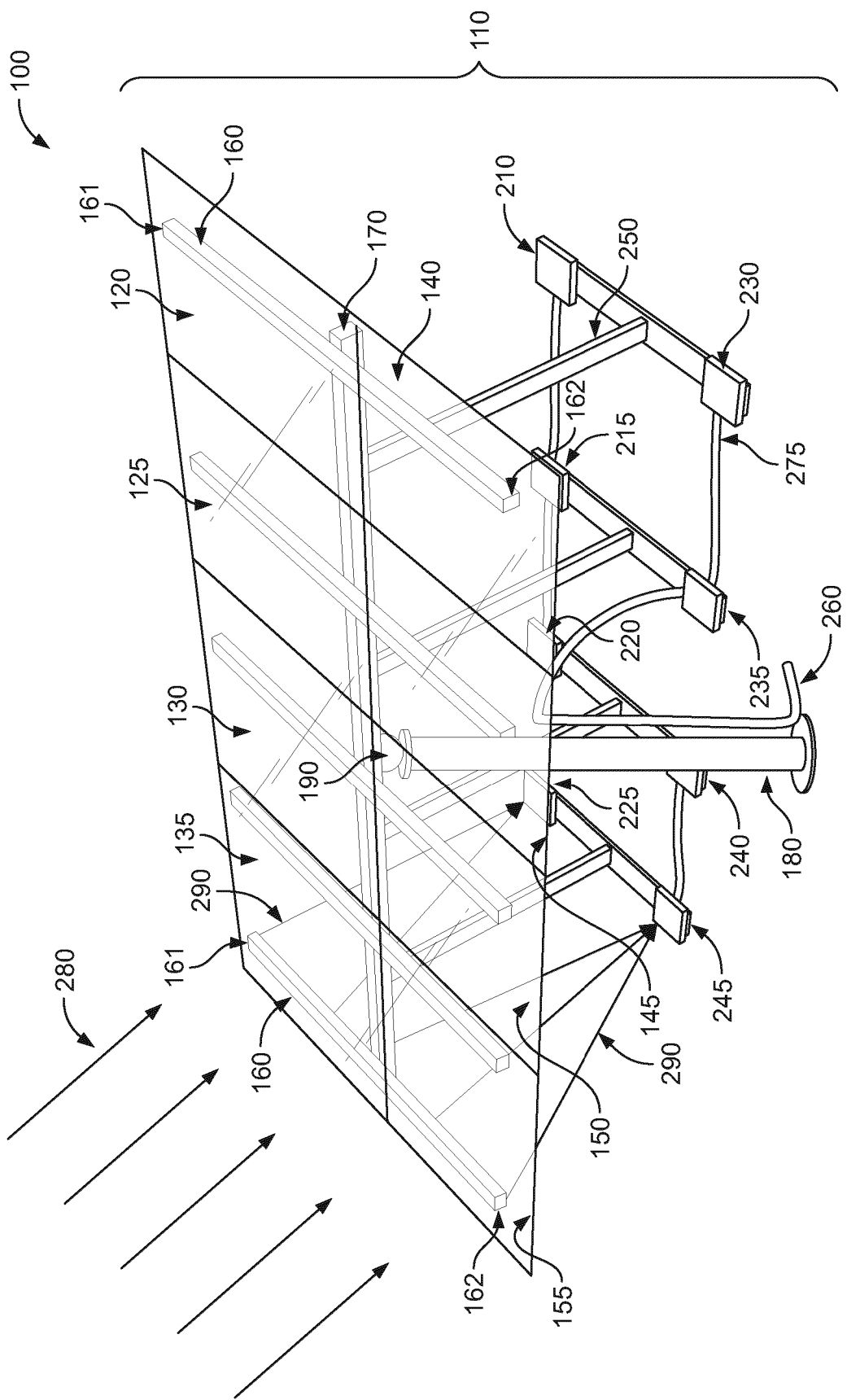
FIG. 16 shows schematically a solar concentrator according to an embodiment of the invention.

The general concept of the present invention is to divide the refracting prisms (microstructures) of the optical element into groups that each have a shorter focal distance than a conventional Fresnel lens, as shown in FIGS. 7, 9 and 10. Using this principle, the light will diverge when it passes the common focal area 518 as shown in FIGS. 7, 9 and 10. Therefore, unwanted focal points 516 further away than the focal plane 506 will be significantly weaker than for a normal Fresnel lens in which the non-normal light refracted by neighbouring gratings may converge at distances higher than the ideal focal depth. For instance, as shown by FIG. 16, lens and solar receivers will typically be mounted to a framework that can be moved to align with the incident solar light. The solar receivers are thus at a higher position compared with the ground 514. Put another way, the ground is further from the lens plane 504 that the receivers, such that any non-normal light that "misses" the receivers will have to travel further before it is incident on the ground, where it creates unwanted focal areas. However, due to the diverging light, it will have less intensity when incident on the ground than on the receiver (compared with the unwanted focal areas 512 in the conventional les of FIG. 3), and so these unwanted focal areas are inherently more safe.

This is done by making bands of Fresnel gratings (groups of microstructures) in which the angle increases more steeply with increased radius relative to an imaging Fresnel lens. This results in light from each band (group) that will diverge shortly after the optical element plane (see FIGS. 7, 9 and 10: the light diverges after the group focal plane). At the transition from one group to the next, a discontinuous change in angle takes place in order for the next group to focus the light onto the focal area.

Figure 5:
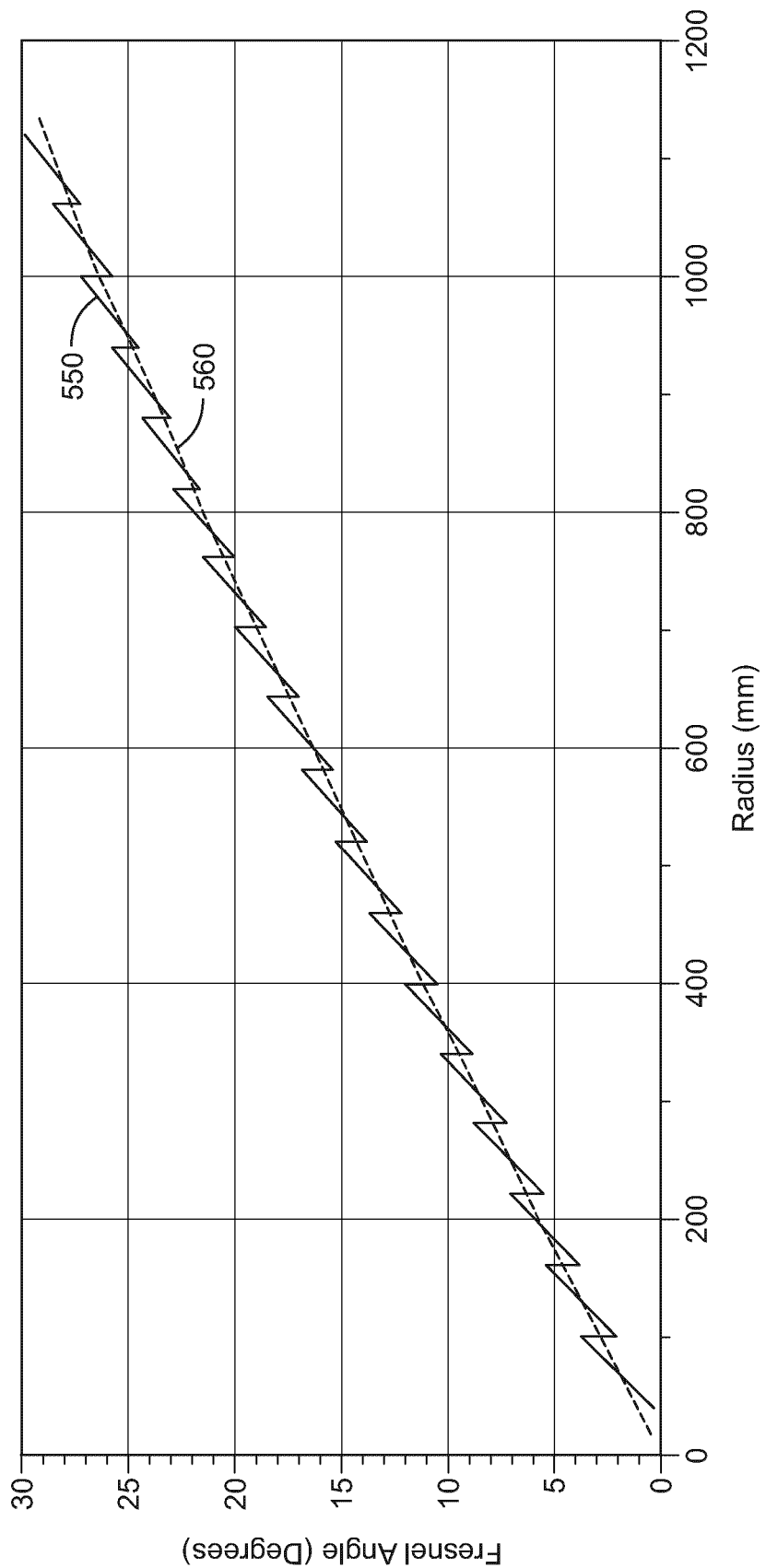
FIG. 5 shows a graph of the variation of the deflection angle of the microstructures of an optical element with radial distance from the centre of focus, for an imaging Fresnel lens (black line) and for an optical element of the invention (blue stepped line).
Figure 6:
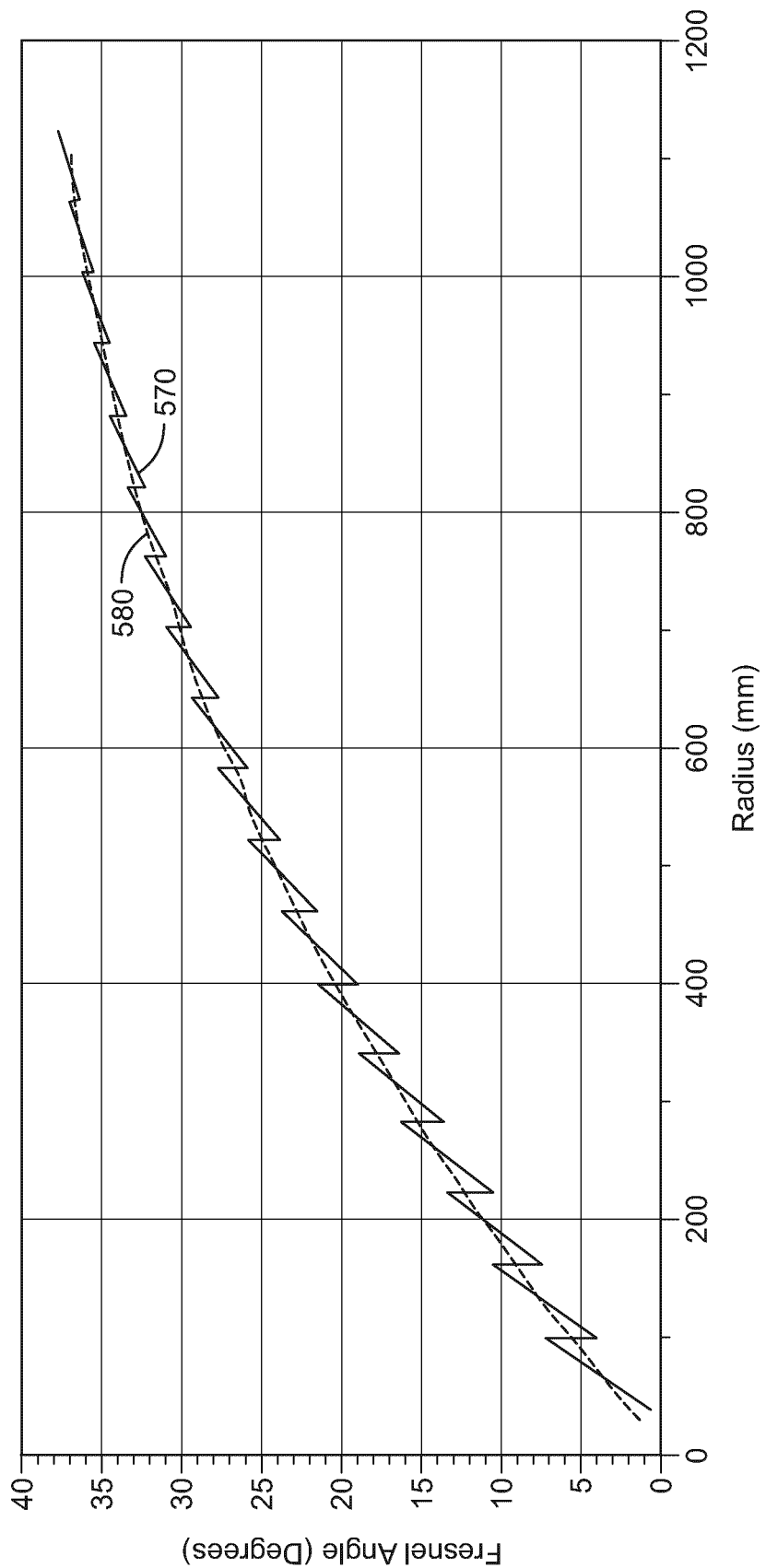
FIG. 6 shows a graph of the variation of the Fresnel angle of the microstructures of an optical element with radial distance from the centre of focus, for an imaging Fresnel lens (black line) and for an optical element of the invention (blue stepped line).

To create a structure with the described principle, in a preferred embodiment of the invention the prism angle within each group will differ from that of the ideal Fresnel angle in the following way; at the inner part (lower radius) of the group, the angle of the prisms (microstructures) will be lower than for an imaging Fresnel lens, and for the outer part (higher radius) the prism angles will be higher than for a conventional Fresnel lens. Therefore, the angle of deflection of the microstructures close to the centre of the lens (ie where r is small) is lower within each group of microstructures n, n+1, . . . than the ideal, and the angle of deflection of the microstructures further from the centre of the lens (r is larger) is higher within each group of microstructures. At intermediate values of r, the change of the angle of deflection within each group of microstructures is closely similar to that of an ideal Fresnel lens. This is illustrated in FIG. 5 (compare "prior art" 560 with "invention" 550). In order to achieve this, the Fresnel angle for the microstructures within each group is changed compared to the ideal Fresnel lens as shown in FIG. 6 (compare "prior art" 580 with "invention" 570): the prism angle of the groups of microstructures closer to the centre of the lens (ie where r is small) is lower within each group of microstructures n, n+1, . . . than in the ideal Fresnel lens, and the prism angle of the microstructures further from the centre of the lens (r is large) is higher within each group of microstructures compared to a conventional Fresnel lens. At intermediate values of r, the prism angle within each group of microstructures is closely similar to that of an ideal Fresnel lens. As noted below, other ranges of prism angle may also be used to achieve the effect of the invention.

The selection of the angle of the microstructures for each group such that the angle increases with increasing radial distance from the centre point results in the refracted light from the smallest radial distance from the centre point within a given group and the refracted light from the largest radial distance from the centre point within a given group crossing at a plane closer to the optical element than the focal plane. This causes the light being refracted from each of the said groups to diverge before the focal plane. Accordingly, the light incident on the focal plane is divergent, rather than convergent as is conventional for optical elements used in solar concentrators. In certain embodiments of the invention, the light refracted from a given group of microstructures will cross at a plane that lies between the plane of the optical element and the focal plane, which plane is referred to herein as the group focus plane.

Selection of the angles of the microstructures of each of the individual groups to form a common focal area at the focal plane when illuminated by light incident normal to the plane of the optical element results in the light that is normally incident on the optical element and refracted from each group coinciding at the focal area, which includes the centre of focus, and thus the light being concentrated onto the focal area, despite the light from each group diverging at the focal plane. In contrast, however, for non-normally incident light, the regions in which this light is incident on the focal plane do not coincide, and so light incident on the focal plane that originates from non-normal light incident on the optical element is diffused over a relatively wide area, thus reducing the energy incident on any particular part of the focal plane other than the desired focal area. Consequently, the likelihood of heat or fire damage to items that are located in or around the focal plane but outside the desired focal area is reduced. In the context of a solar concentrator, therefore, the receiver, which is placed at the common focal area, is illuminated with several coincident beams of light, each of which beams are divergent at the focal area, whereas other areas beneath the solar concentrator are not excessively heated, and hot spots resulting from light incident on the optical element from a non-normal angle are not obtained.

Further, the points at which light refracted by the optical element crosses are different for each group of microstructures, and so minimize the likelihood of hot spots of damaging intensity being formed between the optical element and the focal plane.

Preferably, the angle of the microstructures with respect to the plane of the optical element within each group increases linearly with increasing radial distance from the centre point. This maximizes the divergence of the light deflected by each group, and so is preferred from the point of view of reducing the likelihood of forming hot spots, and thus safety.

Preferably, the optical element is in the form of a Fresnel lens. Preferably, the microstructures are Fresnel microstructures.

Preferably, the microstructures are in the form of linear sawtooth gratings. That is to say, each group of microstructures has a constant rate of increase of angle with respect to the plane of the lens (prism angle or Fresnel angle), and between each group of microstructures there is a stepwise discontinuity which is normal to the plane of the lens.

The planar optical element of the invention preferably does not have a macroscopically convex geometry on either surface, nor does it comprise additional structures such as microlenses on either surface. Thus, the optical element of the invention provides a simply constructed and light weight optical element which can be manufactured at low cost, such as by roll-to-roll processing methods and using polymer films.

Preferably, the point at which the refracted light from the smallest radial distance from the centre point of the optical element within a given group crosses the focal plane and the point at which the refracted light from the largest radial distance from the centre point of the optical element within a given group crosses the focal plane are further apart than the distance between the smallest radial distance from the centre point and the largest radial distance from the centre point of the optical element within that group. This causes the plane at which light refracted from the largest and smallest radial distances from the centre point within the same group crosses, to be closer to the plane of the optical element than to the focal plane. This increases the degree of divergence of light refracted from each group, and thus decreases the risk of formation of unwanted focal spots, as these cannot be formed closer to the optical element than the plane at which light refracted from the largest and smallest radial distances from the centre point within the same group crosses.

Preferably, the plane at which the refracted light from the smallest radial distance from the centre point of the optical element within a given group crosses the refracted light from the largest radial distance from the centre point of the optical element within the same group is closer to the plane of the optical element than X times the focal distance of the optical element, where X is smaller than 1, preferably smaller than 0.9, more preferably smaller than 0.8, yet more preferably smaller than 0.7, such as smaller than 0.6, more preferably smaller than 0.5, yet more preferably smaller than 0.4, such as smaller than 0.3, more preferably smaller than 0.2, yet more preferably smaller than 0.1. The focal distance of the optical element is the distance, measured normal to the plane of the optical element, between the optical element and the focal plane. Again, the closer the plane at which the refracted light from the smallest radial distance from the centre point of the optical element within a given group crosses the refracted light from the largest radial distance from the centre point of the optical element within the same group to the optical element, the greater the divergence of the refracted light within each group, and the less the risk of formation of unwanted focal spots capable of intense heating.

Preferably, the focal area is centred on the centre of focus.

The optical element comprises a centre point at radius $r=0$, with r increasing with increasing distance from the centre point. Projection of the centre point normally to the plane of the optical element on to the focal plane results in the centre of focus. Groups of microstructures labelled n, n+1, n+2 etc are concentrically arranged around the centre point, with the smallest radial distance from the centre point $r=0$ to group of microstructures n being $r_n$, to group of microstructures n+1 being $r_{n+1}$, and so on. The radial width of each group of microstructures is equal to 2x; that is, the radial distance between $r_n$ and $r_{n+1}$ is $2x_n$, that between $r_{n+1}$ and $r_{n+2}$ is $2x_{n+1}$, and so on. While in the Figures $x_n$ is equal to $x_{n+1}$, the skilled reader will understand that that need not necessarily be the case, and the angles of the microstructures of the groups may be adjusted to allow for different group widths. Each group of microstructures is in the form of a linear sawtooth grating, and thus in cross section has a generally right-angled-triangular form with one vertical (normal to the plane of the optical element) facet at the radially outer extent of the group, a horizontal edge parallel to the plane of the optical element and an angled facet that faces the incident light in use and which is angled to refract light normally incident on the optical element in use towards the centre of focus.

The angled facet of each group of microstructures will be at a different angle with respect to the plane of the optical element, and the angles in each case are selected to result, in use, in light normally incident on the optical element being directed on to a focal area in the focal plane. The angles of the angled facet of each group of microstructures are chosen with reference to the Fresnel angle required by an imaging Fresnel lens to direct normally-incident light on to the centre of focus. Within the radial width of a group of microstructures n, ie $r_n$ to $r_{n+2}x_n$, the Fresnel angle of the microstructures at one value of r within the range $r_n$ to $r_{n+2}x_n$ will usually equal the Fresnel angle required by an imaging Fresnel lens to direct normally-incident light on to the centre of focus at that same value of r.

That the angle of the angled facet of the microstructures increases with increasing radial distance r from the centre point of the optical element at r=0, and does so linearly at a greater rate than that which is observed for an imaging Fresnel lens over the same range of radial distance from the centre point, results, in use, in light normally incident on that group of microstructures being refracted such that the refracted light from the smallest radial distance from the centre point within a given group ($r_e$) and the refracted light from the largest radial distance from the centre point within a given group ($r_{n+2}x_n$) crossing at a plane closer to the optical element than the focal plane. This causes the light being refracted from each of the said groups to diverge before the focal plane. That is, light refracted from a given group of microstructures will cross at one or more planes that lie between the plane of the optical element and the focal plane.

Preferably, for each group of microstructures spanning a radial distance r to r+2x, the design of the optical element is created by setting the angle of the microstructures equal to the angle required to refract light to the centre of focus at the focal plane at a radial distance of r+x. Where this is done, the selection of the angle of the microstructures for each group such that the angle increases with increasing radial distance from the centre point results in the refracted light from the smallest radial distance from the centre point within a given group crossing the focal plane without having crossed the line normal to the plane of the optical element and connecting the centre point of the optical element to the center of focus, and the refracted light from the largest radial distance from the centre point within a given group crossing the focal plane after having crossed the line normal to the plane of the optical element and connecting the centre point of the optical element to the center of focus. In combination with selection of the angles of the microstructures of each of the individual groups to form a common focal area at the focal plane when illuminated by light incident normal to the plane of the optical element, this results in the light that is normally incident on the optical element and refracted from each group being distributed across the focal area.

In FIG. 7, an optical element is depicted in which the design is created by setting, within each group of microstructures, the angle at a radius of r+x equal to the Fresnel angle required by an imaging Fresnel lens to direct normally-incident light on to the centre of focus at a radius of r+x. As can be seen from FIG. 7, this results in a focal area common to all groups of microstructures which is centred on the centre of focus of the optical element, and in which half of the normally-incident light refracted by each group of microstructures crosses the centre of focus and half does not. Thus, the light incident on the focal area on each side of the centre of focus comprises light that was incident on the optical element on both sides of the centre point of the optical element.

The result of the change to the microstructures of the optical element can be seen in FIG. 7. Each group of microstructures in the optical element is arranged to focus the incident light to a separate annular focus line at the group focus plane, which lies in front of the focal plane in which the receiver lies. For normal-incident light, shown on the left of the Figure, the focused light diverges once again having passed through the group focus plane, and produces a focal area at the focal plane in which the light from each group of microstructures n, n+1, . . . results in focal areas that are coincident, thus concentrating the light on to the desired focal area, for instance to heat a receiver filled with heat transfer fluid. For non-normal incident light, however, the light from each group of microstructures n, n+1, . . . converges to a separate focus line in the group focus plane and then diverges to produce separate focal areas at the focal plane. Thus, the focal areas resulting both from normal incident light and from non-normal incident light are not sharp foci, as for an imaging Fresnel lens, but are more diffuse. The focal areas resulting from normal incident light are coincident and thus cause the desired heating of the receiver placed at the focal area; however, the focal areas resulting from non-normal incident light are not coincident and so the heating caused thereby at any particular point in the focal plane is therefore reduced compared with that caused by non-normal light incident on an imaging Fresnel lens. Accordingly, the likelihood of damage or fire caused by unwanted foci or focal areas from non-normal light incident on the optical element is significantly reduced compared with the use of a conventional imaging or non imaging Fresnel lens.

The optical element can be constructed such that the group focus plane is closer to the optical element than to the focal plane, equidistant between them, or closer to the focal plane than the optical element. The closer the group focus plane is to the optical element, the safer the optical element, as the unwanted focal areas will be more diffuse at the focal plane with increasing distance between the group focus plane and the focal plane. However, increasing distance between the group focus plane and the focal plane also causes enlargement of the focal area produced by light incident normal to the plane of the optical element. The width of the focal area can be tailored by adjusting the width of the groups n, n+1, . . . . When the groups are made more narrow, the optical element comprises more groups, and this produces a narrower focal area.

FIG. 5 shows the variation of deflection angle of the groups of microstructures as a function of radius, and FIG. 6 shows the variation of Fresnel angle of the groups of microstructures as a function of radius (stepped line) for an optical element as shown in FIG. 7 compared with that for an imaging Fresnel lens (smooth line). Further, FIG. 8 also shows the variation of Fresnel angle of the groups of microstructures with radius, with the groups of microstructures n, n+1, n+2, n+3 labelled along with their radial ranges, namely that group n extends from radius $r_n$ to $r_{n+2}x_n$; group n+1 extends from radius $r_{n+1}$ (which is equal to $r_{n+2}x_n$) to $r_{n+1}+2x_{n+1}$; group n+2 extends from radius $r_{n+2}$ (which is equal to $r_{n+1}+2x_{n+1}$) to $r_{n+2}+2x_{n+2}$; and so on. Along the line of the graph, crosses indicate (schematically and not to scale) the individual microstructures or prisms that together form the group of microstructures. Typically, the width of each microstructure or prism will be 75 to 250 µm.

It can be seen from FIG. 5 that the deflection angle for each group of microstructures n, n+1, etc coincides with that for the imaging Fresnel lens at a radius which is at the midpoint of the radial width of each group of microstructures $r_n+x_n$, $r_{n+1}+x_{n+1}$, etc. As the rate of increase of the deflection angle with radius within each group of microstructures is greater than that for the imaging Fresnel lens over the same radius range, the angle of deflection at the smallest radius for each group of microstructures is smaller than the corresponding value for the imaging Fresnel lens, and so the normally-incident light incident on the optical element at this radius will be refracted towards the centre of focus but will not be incident upon the centre of focus. At the midpoint of the radial width of each group of microstructures, the angle of deflection equals that for the imaging Fresnel lens at the same radius, and so the normally-incident light incident on the optical element at this radius will be refracted to be incident upon the centre of focus. At the largest radius for each group of microstructures, the angle of deflection is larger than the corresponding value for the imaging Fresnel lens, and so the normally-incident light incident on the optical element at this radius will be refracted in such a way that it crosses a line joining the centre point of the optical element to the centre of focus before it is incident upon the focal plane, and so it will not be incident upon the centre of focus but at a radial distance from it that is equal and opposite to that for the normally-incident light incident upon the optical element at the smallest radius for the same group of microstructures. At the transition from one group to the next, a discontinuous change in angle takes place in order for the next group to focus the light onto the focal area.

A similar relationship between the Fresnel angles of the groups of microstructures of the optical element of FIG. 7 and that of an imaging Fresnel lens is shown in FIG. 6.

Figure 1:
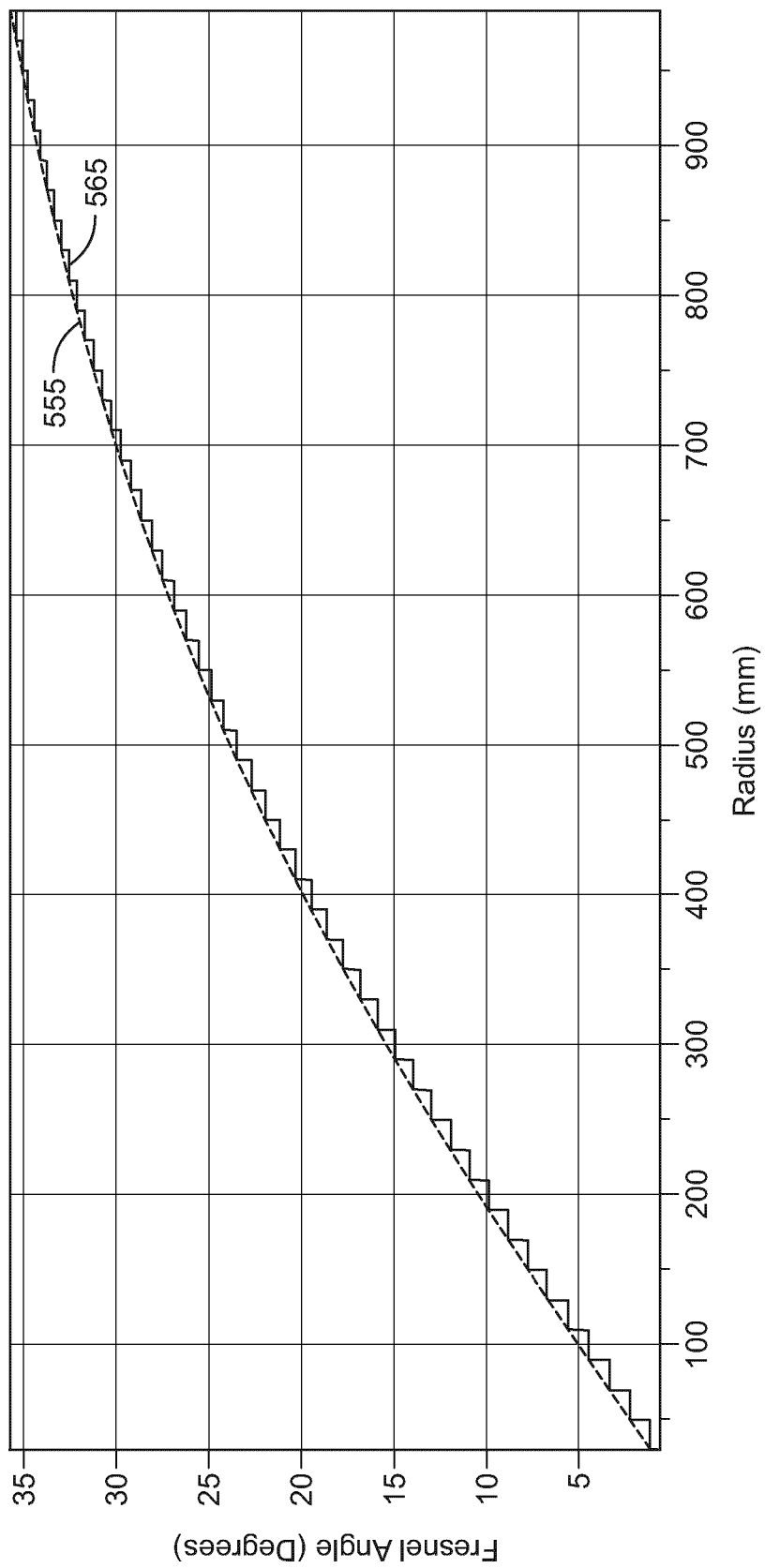
FIG. 1 shows a graph of the variation of the Fresnel angle of the microstructures of an optical element with radial distance from the centre of focus, for an imaging Fresnel lens (black smooth line) and for a non-imaging Fresnel lens (blue stepped line).
Figure 2:
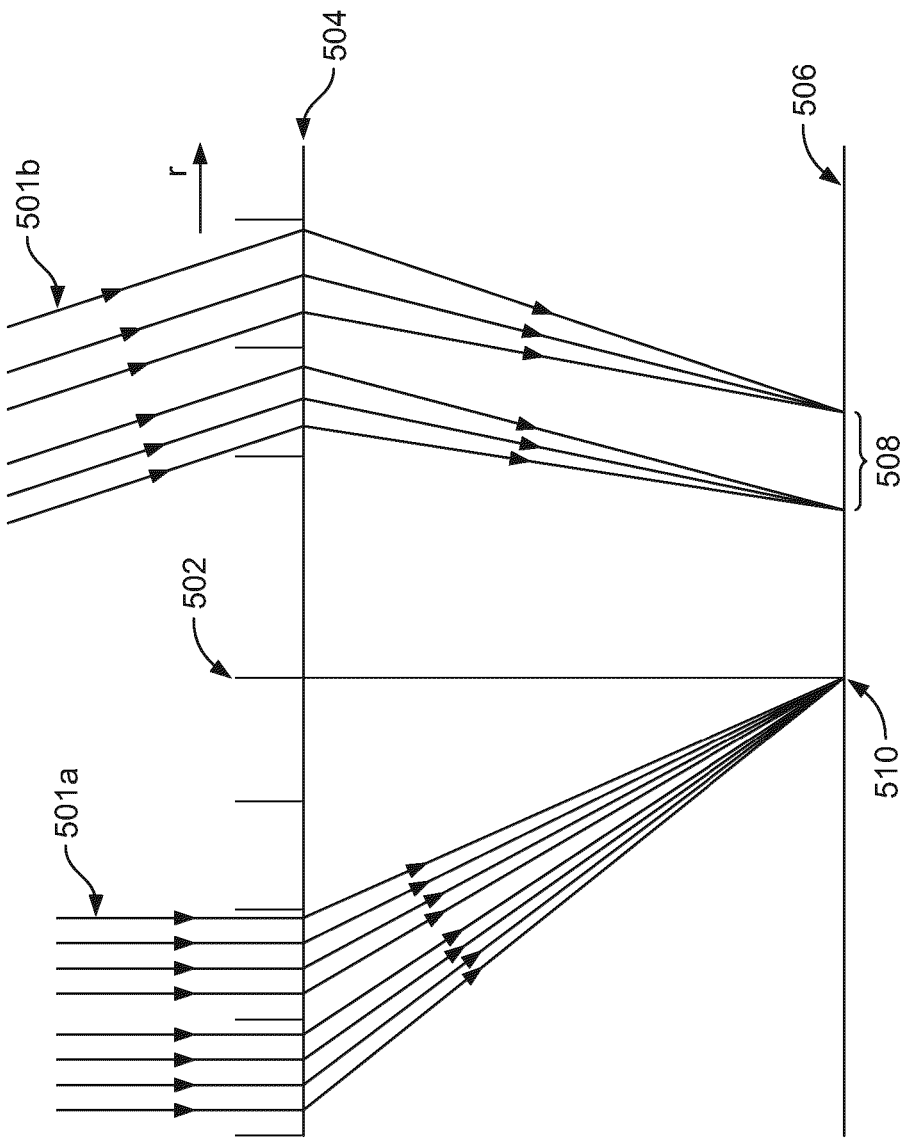
FIG. 2 shows a diagrammatic representation of the behaviour of light incident on an imaging Fresnel lens.

It is to be noted that the change of the angle of the microstructures within each group of microstructures in the invention is different from that used in standard non-imaging Fresnel lenses. It can be seen from FIG. 1, comparing the smooth line showing the ideal Fresnel angle against radius with the stepped line showing the Fresnel angle used for each group of microstructures for a non-imaging lens, that the angle of each group of microstructures in the non-imaging lens remains constant as radial distance increases. In contrast, the deviation from ideal of the angle of the microstructures within each group in the present invention is opposite to that used in a non-imaging Fresnel lens. Comparing the stepped line in FIG. 1 with that of FIG. 5, it can be seen that in FIG. 1 the angle of the microstructures in a given group for a non-imaging Fresnel lens of the prior art makes a negative deviation from the ideal angle with increasing radius. Conversely, in FIG. 5 it can be seen that the angle of the microstructures in a given group in an optical element of the present invention makes a positive deviation from the ideal angle with increasing radius.

The change in the angle of the microstructures for a conventional non-imaging Fresnel optical element is zero within each group (see FIG. 1 stepped line). In contrast, in the invention, within each group the angle of the microstructures increases with increasing radius at a rate greater than that for an imaging Fresnel lens at the same range of radial distance from the centre (see FIG. 5).

However, it is possible also for the design of the optical element to set the angle of the microstructures equal the angle required to refract light to the centre of focus at the focal plane at a radial distance of r, or at a radial distance of r+2x or at any other intermediate point within the range r to r+2x, for a given group of microstructures.

For example, as shown in FIG. 9, where for each group of microstructures spanning a radial distance r to r+2x, the angle of the microstructures is equal to the angle required to refract light to the centre of focus at the focal plane at a radial distance of r+2x, the selection of the angle of the microstructures for each group such that the angle increases with increasing radial distance from the centre point results in there being a focal area formed by that group which includes the centre of focus only at the extreme edge of the focal area (when considering the light incident on one side of the centre point of the optical element only), and with none of the light normally incident on that group crossing the centre of focus.

It has been recognized by the inventors that for efficient energy transfer to a focal area, particularly in the context of receivers for solar concentrators, the distribution of incident energy should be as even as possible across the focal area. Where the focal area is circular, directing light towards that focal area will lead to an increased energy incident on the smaller area in the centre of the focal area, and more diffuse energy distribution across the outer areas of the focal area. Thus, in some embodiments, it is advantageous to direct a greater proportion of the incident light to the outer regions of the focal area than to the central part of the focal area. This may be achieved by, for some or all of the groups of microstructures, excluding the centre of focus and the immediately surrounding area from the focal area, thus resulting in an annular focal area that surrounds but does not include the centre of focus. Suitably, in order to exclude the centre of focus and the areas surrounding it that would be illuminated by solar radiation normal to the plane of the optical element at a radius at which the angle of the microstructures is equal to the angle required to refract light to the centre of focus at the focal plane as a result of the spread caused by the geometrical size of the solar disc, directing normally-incident light such that it is directed to the centre of focus is excluded by setting the angle of the microstructures at a radial distance of r+2x equal to the angle required to refract light to a point that is radially distant from the centre of focus by a distance calculated as the product of the perpendicular distance between the plane of the optical element and the focal plane, and the tangent of 0.275°, the said point being one reached by the light crossing the focal plane without having crossed the line normal to the plane of the optical element and connecting the centre point of the optical element to the center of focus.

Alternatively, as shown in FIG. 10, where for each group of microstructures spanning a radial distance r to r+2x, the angle of the microstructures is equal to the angle required to refract light to the centre of focus at the focal plane at a radial distance of r, the selection of the angle of the microstructures for each group such that the angle increases with increasing radial distance from the centre point results in there being a focal area formed by that group which includes the centre of focus only at the extreme edge of the focal area (when considering the light incident on one side of the centre point of the optical element only), and with all of the light normally incident on that group crossing the centre of focus.

Where in this embodiment it is wished to excluding the centre of focus and the immediately surrounding area from the focal area, directing normally-incident light such that it is directed to the centre of focus is excluded by setting the angle of the microstructures at a radial distance of r equal to the angle required to refract light to a point that is radially distant from the centre of focus by a distance calculated as the product of the perpendicular distance between the plane of the optical element and the focal plane, and the tangent of 0.275°, the said point being one reached by the light crossing the focal plane having first crossed the line normal to the plane of the optical element and connecting the centre point of the optical element to the center of focus.

Preferably, the radial distance within the range r to r+2x at which the design of the optical element sets the angle of the microstructures equal to the angle required to refract light to the centre of focus at the focal plane is the same for each group, in order that the focal areas formed by each group are completely coincident.

The skilled person will recognize that there are intermediate positions between the extremes depicted in FIGS. 9 and 10. Where for each group of microstructures spanning a radial distance r to r+2x, the design of the optical element sets the angle of the microstructures equal to the angle required to refract light to the centre of focus at the focal plane at a radial distance within the range r to r+2x that is not equal to r, r+2x or r+x, the focal area formed by that group will include the centre of focus offset from the centre of the focal area for that group, and with some of the light normally incident on that group crossing the centre of focus and some not crossing the centre of focus. These latter arrangements are less preferred as, when the normally incident light on the optical element is refracted by all of the groups of microstructures, it may result in an uneven distribution of focused light across the focal area, which, in the context of solar concentrators, will result in an uneven transfer of energy to the receiver present at the focal area. This is less efficient, therefore, than the preferred arrangements in which the centre of the focal area for each group coincides with the centre of focus of the optical element, and thus results in a more even distribution of light across the focal area, such as the arrangements shown in FIGS. 7, 9 and 10.

As mentioned above, it is preferred in some embodiments that directing normally-incident light such that it is directed to the centre of focus is excluded, in order to improve the even distribution of energy across the focal area.

Where the optical element is one in which the light normally incident on each group is distributed by the group of microstructures such that some light crosses the focal plane without having crossed the line normal to the plane of the optical element and connecting the centre point of the optical element to the center of focus, and some light crosses the focal plane having first crossed the line normal to the plane of the optical element and connecting the centre point of the optical element to the center of focus, a different approach to providing an annular focal area that surrounds but does not include the centre of focus must be taken to that discussed above for the embodiments depicted in FIGS. 9 and 10. The present inventors have determined that this can be achieved by including a discontinuity in the change, or gradient, of the angle of the microstructures at the radius for which the design of the optical element sets the angle of the microstructures equal to the angle required to refract light to the centre of focus at the focal plane at that radial distance, such that the angle of the microstructures never equals the angle required to refract light to the centre of focus at the focal plane. However, the design of the angle of the microstructures in each group is still determined by reference to setting the angle equal to the angle required to refract light to the centre of focus at the focal plane at a chosen radial distance within the group.

This embodiment of the invention will be described with reference to an optical element designed such that the angle of the microstructures is set equal to the angle required to refract light to the centre of focus at the focal plane at a radial distance equal to r+x, ie that embodiment depicted in FIGS. 7 and 8. The skilled reader will of course appreciate that this embodiment may also apply where the angle of the microstructures is set equal to the angle required to refract light to the centre of focus at the focal plane at a radial distance within the range r to r+2x that is not equal to r, r+2x or r+x, and thus in which the focal area formed by that group will include the centre of focus offset from the centre of the focal area for that group.

As a practical matter, the centre of the focal area, being the focal area that is illuminated as a result of light refracted from microstructures having an angle equal to the angle required to refract light to the centre of focus at the focal plane, includes both the geometrical centre of focus defined above, and also a surrounding area that is illuminated due to the spread of the incident light due to the geometrical size of the sun disc (±0.275°). This spread (radius of the surrounding area) can be calculated as focal distance×tan 0.275°. In the case of a focal distance of 2000 mm, the spread will be approximately ±10 mm.

In order to provide an annular focal area that surrounds but does not include the centre of focus, the intensity distribution of the light incident on the focal area is simulated by ray tracing, taking into account the spread of the incident light described above. The number of the microstructures that would result in light being incident on the centre of the focal area can then be reduced for some or all of the groups of microstructures in the lens, for example by introducing a discontinuity into the gradient of the change of angle of the microstructures at the relevant radii. The introduction of such a discontinuity defines subgroups within each group of microstructures.

Figure 8:
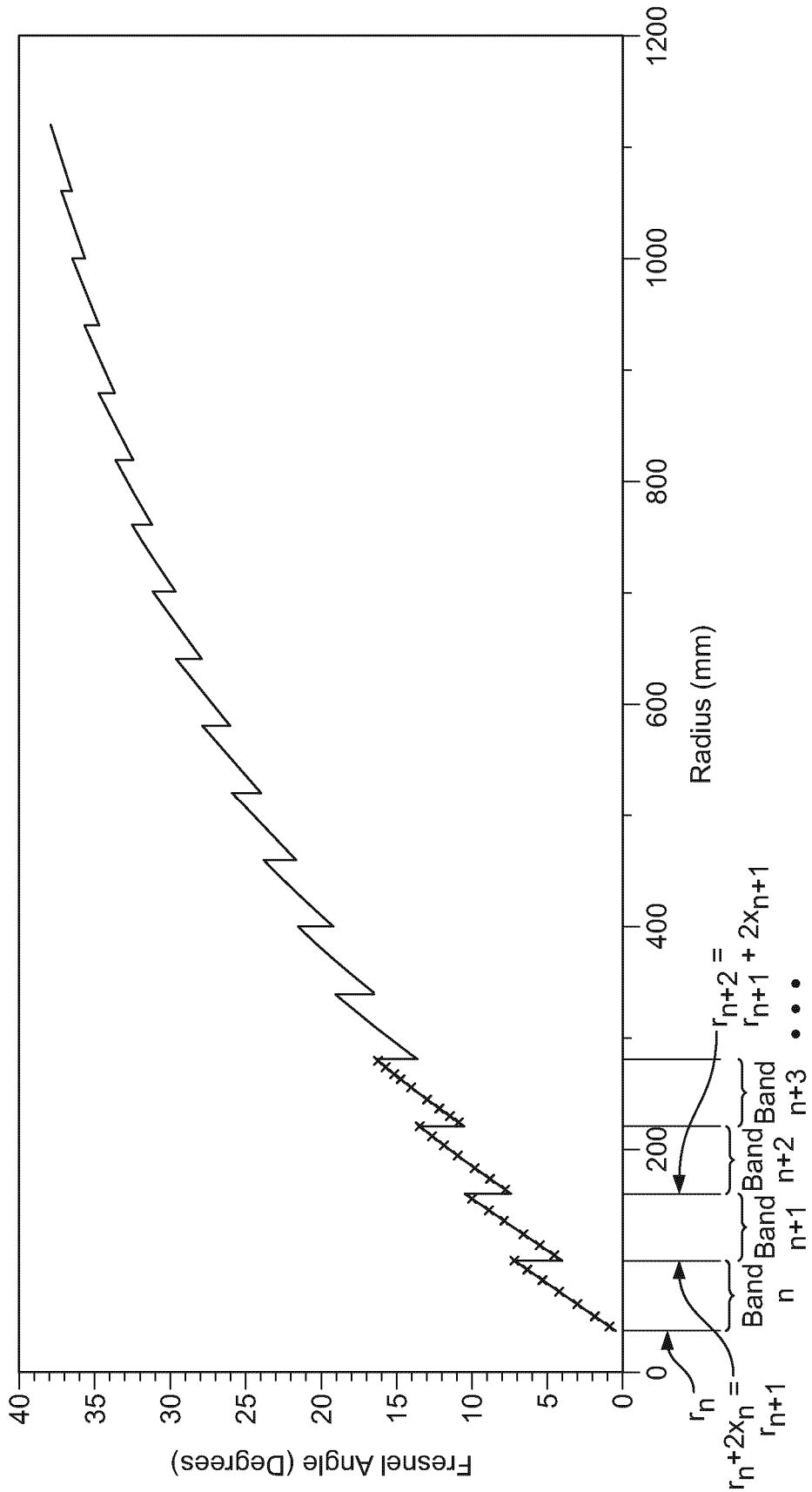
FIG. 8 shows a graph of the variation of the Fresnel angle of the microstructures of an optical element according to the embodiment of the invention shown in FIG. 7 with radial distance from the centre of focus.
Figure 11:
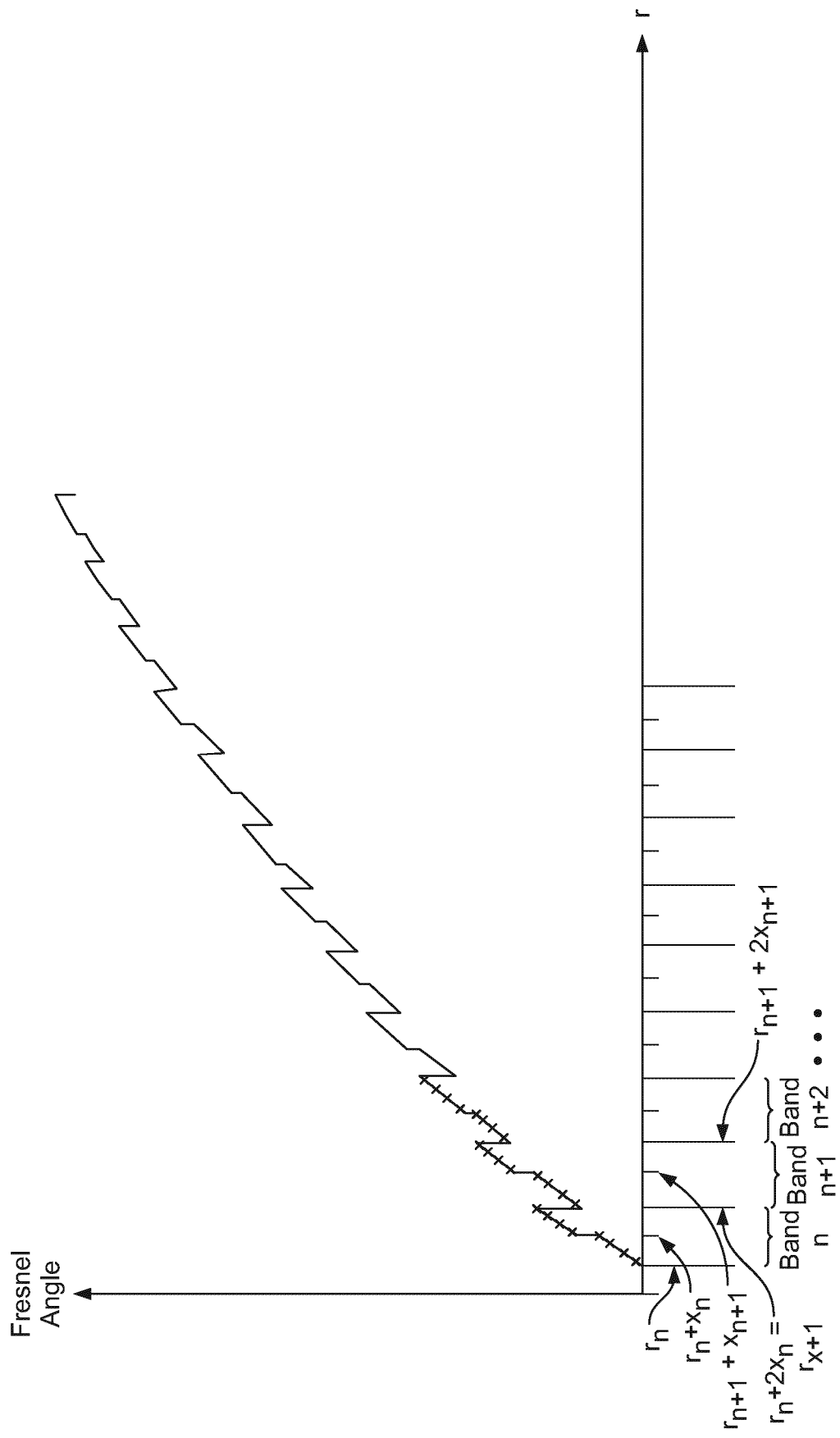
FIG. 11 shows a graph of the variation of the Fresnel angle of the microstructures of an optical element according to a preferred embodiment of the invention with radial distance from the centre of focus.

A suitable relationship between the Fresnel angle and radius for such subgroups is depicted in FIG. 11, which may be compared with the relationship between Fresnel angle and radius for an optical element according to the invention and without such a discontinuity, as depicted in FIG. 8. As for FIG. 8, FIG. 11 shows the variation of Fresnel angle of the groups of microstructures with radius, with the groups of microstructures n, n+1, n+2, n+3 labelled along with their radial ranges, namely that group n extends from radius $r_n$ to $r_{n+2}x_n$; group n+1 extends from radius $r_{n+1}$ (which is equal to $r_{n+2}x_n$) to $r_{n+1}+2x_{n+1}$; group n+2 extends from radius $r_{n+2}$ (which is equal to $r_{n+1}+2x_{n+1}$) to $r_{n+2}+2x_{n+2}$; and so on. Along the line of the graph, crosses indicate (schematically and not to scale) the individual microstructures or prisms that together form the group of microstructures. Typically, the width of each microstructure or prism will be 75 to 250 µm.

However, the variation of Fresnel angle with radius differs in FIG. 11 from that shown in FIG. 8 as at a radius of r+x within each group is a discontinuity in the gradient of the Fresnel angle, such that the Fresnel angle for each group of microstructures n, n+1, etc never coincides with that for the imaging Fresnel lens. This divides each group of microstructures into two subgroups, that at smaller radial distances from the centre of the optical element, spanning, in group n, from radius $r_n$ to $r_n+x_n$, and that at larger radial distances from the centre of the optical element, spanning, in group n, from radius $r_n+x_n$ to $r_{n+2}x_n$. As for FIG. 8, the rate of increase of the Fresnel angle with radius within each group of microstructures is greater than that for the imaging Fresnel lens over the same radius range. However, while the rate of increase of the Fresnel angle with radius remains the same in both subgroups of each group, the Fresnel angle range spanned by the subgroup at smaller radius ($r_n$ to $r_n+x_n$) uses Fresnel angles that are all lower than the ideal value, and the Fresnel angle range spanned by the subgroup at larger radius ($r_n+x_n$ to $r_{n+2}x_n$) uses Fresnel angles that are all higher than the ideal values for those radii. A vertical discontinuity at $r_n+x_n$ ensures that at no point does the Fresnel angle within the group equal the ideal value. Accordingly, within the subgroup at smaller radius, the angle of deflection at the smallest radius $r_n$ refracts normally-incident light towards the centre of focus but not to be incident upon the centre of focus. The angle of deflection at the largest radius within this subgroup, just below $r_n+x_n$ (as the discontinuity occurs at $r_n+x_n$), also refracts normally-incident light towards the centre of focus but not to be incident upon the centre of focus. The light incident at each of these radii will cross before the focal plane is reached. Similarly, within the subgroup at larger radius, the angle of deflection at the smallest radius just above $r_n+x_n$ (as the discontinuity occurs at $r_n+x_n$) refracts normally-incident light in such a way that it crosses a line joining the centre point of the optical element to the centre of focus before it is incident upon the focal plane, and so it will not be incident upon the centre of focus but at a radial distance from it that is equal and opposite to that for the normally-incident light incident upon the optical element at the largest radius for the subgroup at smaller radius. The angle of deflection at the largest radius within this subgroup, at $r_{n+2}x_n$ also refracts normally-incident light in such a way that it crosses a line joining the centre point of the optical element to the centre of focus before it is incident upon the focal plane, and so it will not be incident upon the centre of focus but at a radial distance from it that is equal and opposite to that for the normally-incident light incident upon the optical element at the smallest radius for the subgroup at smaller radius. The light incident at each of these smallest and largest radii of the subgroup at larger radius will cross before the focal plane is reached. In addition, as for the optical element of FIG. 8, the light refracted from the smallest radial distance from the centre point within a given group and the light refracted from the largest radial distance from the centre point within a given group cross at a plane closer to the optical element than the focal plane. The planes in which: the light refracted from the smallest radial distance from the centre point within a given group and the light refracted from the largest radial distance from the centre point within a given group cross; the light refracted from the smallest radial distance from the centre point within the subgroup of smaller radius for a given group and the light refracted from the largest radial distance from the centre of focus within the subgroup of smaller radius for a given group cross; and the light refracted from the smallest radial distance from the centre point within the subgroup of larger radius for a given group and the light refracted from the largest radial distance from the centre of focus within the subgroup of larger radius for a given group cross; are each different planes that are closer to the optical element than is the focal plane.

Figure 12:
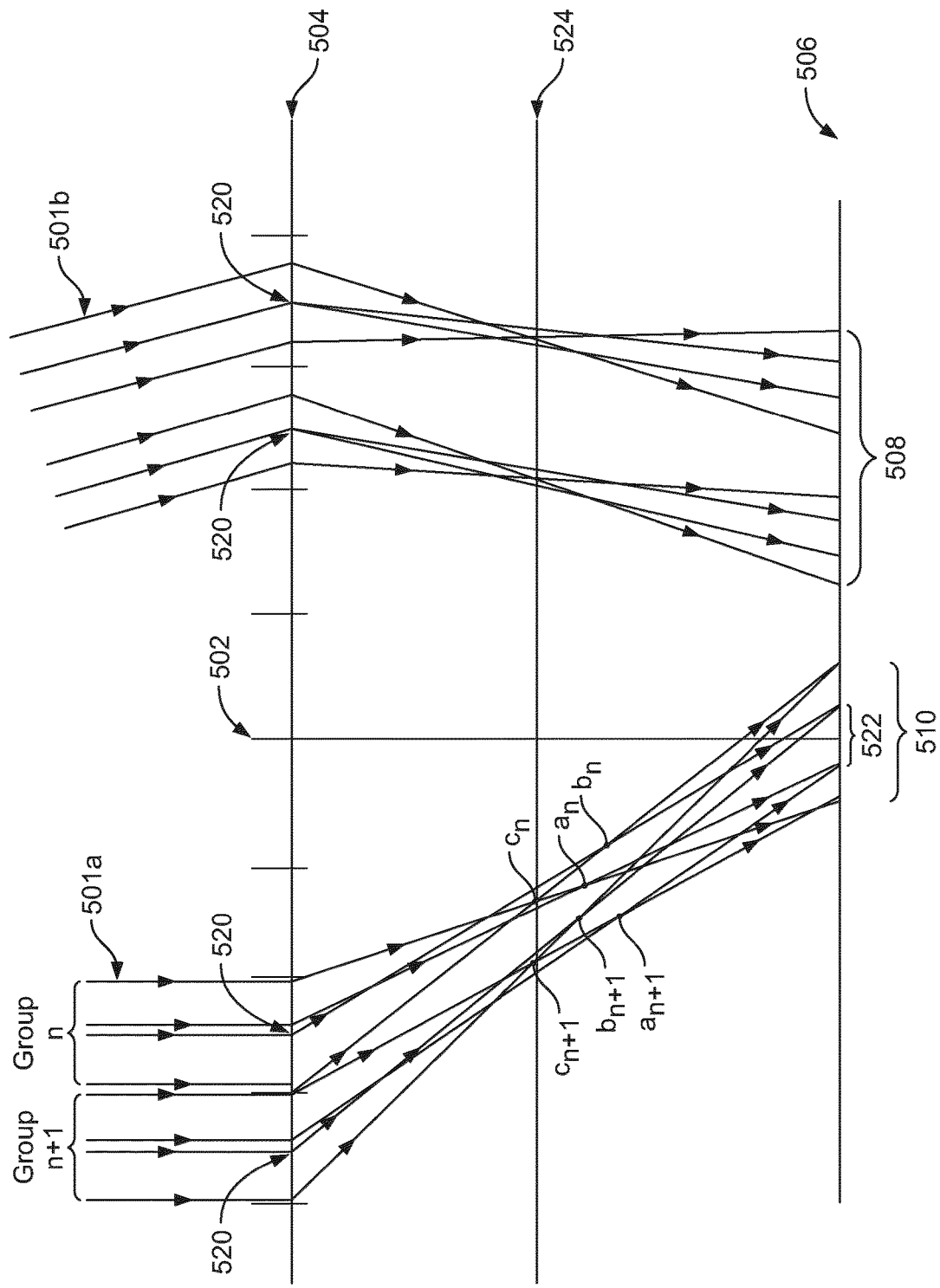
FIG. 12 shows a diagrammatic representation of the behaviour of light incident on a planar optical element according to the embodiment of the invention of FIG. 11.

FIG. 12 depicts the behaviour of light incident on a planar optical element having a dependence of Fresnel angle on radius as shown in FIG. 11. On the left side of the Figure is shown the behaviour of normally-incident light, and on the right side of the Figure the behaviour of non-normally incident light. Looking at the left side of the Figure, light normally incident on two groups n and n+1 is shown, which light is refracted to provide a common annular focal area, which surrounds a circular area centred on the centre of focus. For each of the groups n and n+1, the behaviour of the light incident at the extreme edges of the subgroups of smaller and larger radius is shown. A line representing the plane in which the light refracted from the smallest radial distance from the centre point within a given group and the light refracted from the largest radial distance from the centre of focus within a given group cross is common to both groups, with the crossing points on that line for each group $c_n$ and $c_{n+1}$ shown on the line 524. In addition, there are points $a_n$ and $a_{n+1}$ shown representing the crossing points for the light refracted from extreme edges of the subgroup of smaller radius for a given group, and points $b_n$ and $b_{n+1}$ represent the crossing points for the light refracted from the extreme edges of the subgroup of larger radius for a given group. It will of course be recognized that the crossing points on the Figure in reality form part of an annular line in a plane perpendicular to the plane of the paper, as the optical element is formed of circular concentric groups of microstructures.

Thus, as shown in FIG. 12, the light incident adjacent the discontinuity 520 is divided and directed to be incident on the focal plane to either side of the centre of the focal area. The light incident on the focal area is therefore provided in an annular pattern that surrounds and is centred on, but does not include, the centre 522 of focus.

Figure 13:
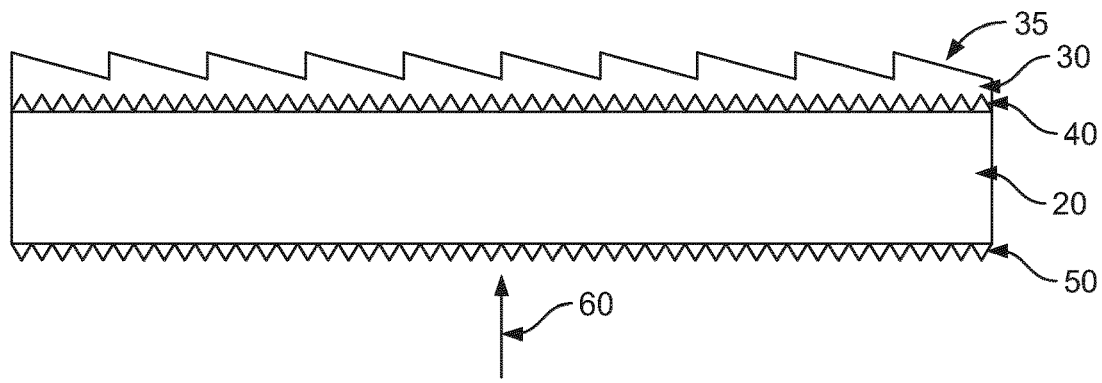
FIG. 13 shows a cross-sectional representation showing the construction of an optical element according to an embodiment of the invention.

Referring to FIG. 13, this depicts a possible construction of the optical element of the first aspect of the invention. Optical element 10 comprises light transmissive glass substrate 20, which is formed from iron-free glass and has a thickness of 5 mm and a length and width of 1500 mm. The light transmissive glass substrate 20 is provided with antireflective nanostructured coatings 40 and 50. The antireflective nanostructured coating 40 is provided on the back surface of the light transmissive glass substrate 20, and the antireflective nanostructured coating 50 on the front surface of light transmissive glass substrate 20, with respect to the direction of incident electromagnetic radiation in use, shown by arrow 60. The antireflective nanostructured coatings 40 and 50 are graded refractive index coatings having an $R_z$ value of 300 nm, an aspect ratio of 0.75 and a real area/macroscopic area ratio of 1.5. On the back surface of light transmissive glass substrate 20, in contact with antireflective nanostructured coating 40, is provided light-transmissive silicone coating 30 of PDMS having a microstructured surface, in which the microstructures are a plurality of groups of microstructures 35, which are circular and concentrically arranged when viewed in plan view.

In use, sunlight is incident on the optical element 10 in the direction of arrow 60. Incident sunlight 60 normal to the front surface of light transmissive glass substrate 20 passes through the antireflective nanostructured coating 50, light transmissive glass substrate 20, antireflective nanostructured coating 40 and into the microstructured light-transmissive silicone coating 30 without refraction. When the incident sunlight 60 reaches the Fresnel microstructures 35 at the back face of silicone coating 30, the sunlight is refracted by the microstructure to an angle (relative to normal) of twice the Fresnel tilt angle, and is also refracted as a result of the change of refractive index between the silicone and the air at the back face of the optical element. Thus, the focused light exits the back face of the optical element 10 at a different angle from the angle at which the incident light 60 entered the silicone coating layer 30. The refraction of the light as it passes through the optical element serves to focus the light on to a focal area at which a solar collector (not shown) is present to receive the focused light.

Figure 14:
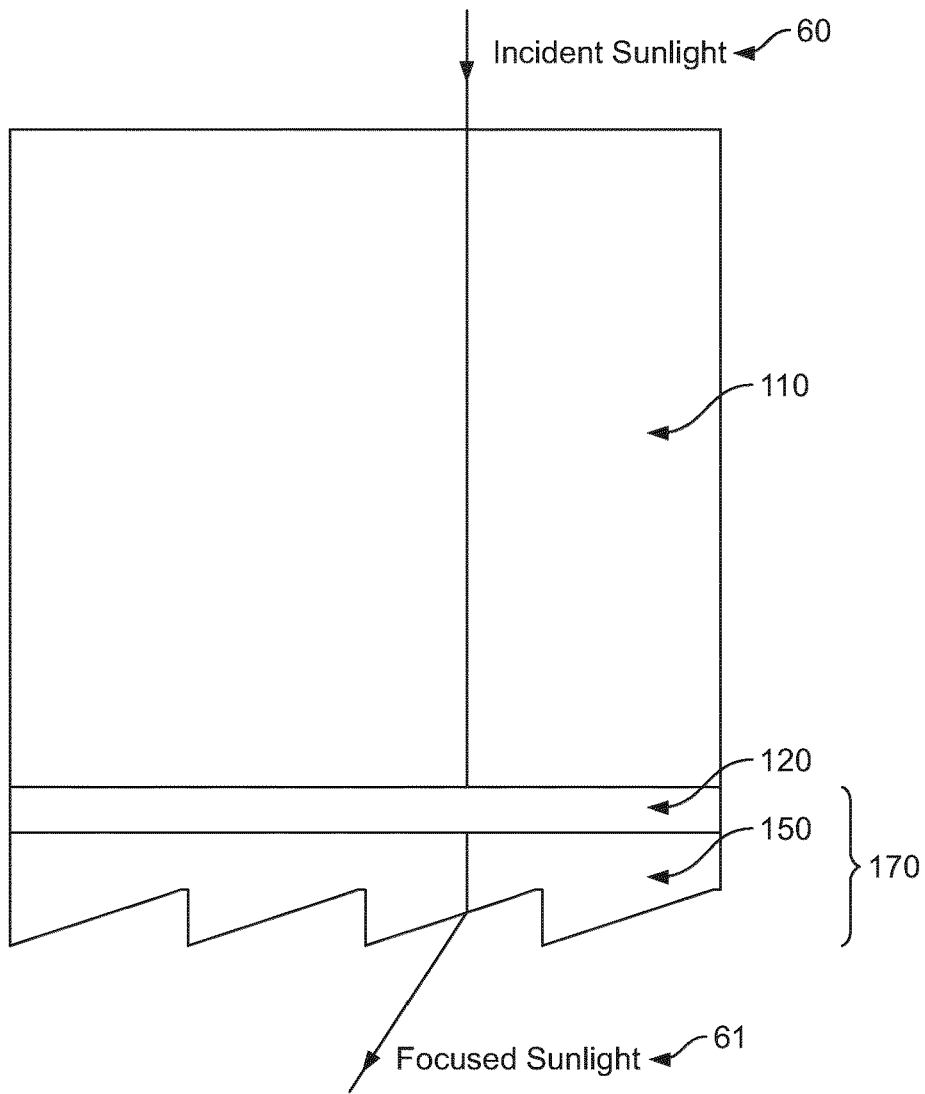
FIG. 14 shows a cross-sectional representation showing the construction of an optical element according to an embodiment of the invention.

Referring to FIG. 14, this depicts another possible construction of the optical element of the first aspect of the invention. The substrate 110 can be made from any material or materials that is/are capable of supporting the focusing polymer foil 170 of the optical element and can withstand the expected environmental conditions to which the optical element will be exposed. Accordingly, a material or materials capable of withstanding high temperatures and abrasion by dust and other particulates is suitable, and which is mechanically rigid, so that the optical element is not distorted and does not become misaligned with its intended focus point in use. As the substrate 110 is provided on the front side of the focusing polymer foil 170, ie on the side of the focusing polymer foil 170 from which light is incident, the substrate 110 must be able to transmit light therethrough. The selection of suitable materials for the substrate 110 must also take into account the switchable adhesive to be used to adhere the focusing polymer foil 170 to the substrate 110, and in particular the conditions under which the switchable adhesive is to be treated in order to release the focusing polymer foil 170 from substrate 110. For example, where the adhesive is removable when heated, the substrate must withstand the necessary heating, for example at least to 80° C.; where the adhesive is to be softened by application of a solvent, the substrate must be inert to that solvent; and where the adhesive is pressure-sensitive, the substrate must be sufficiently robust to withstand the applied force without detriment to its ability to be re-used. Preferably the material for the substrate is able to transmit light therethrough and absorbs or reflects UV light. Suitable materials include polymer (ie plastics material) or glass plate. Glass is a preferred material due to its inertness to UV degradation and its ability to shield polymer layers from short wavelength UV light. In addition, glass has a higher resistance to scratching than many polymers, and so a glass substrate is easier to clean and less likely to be damaged in a short time frame by cleaning or dust abrasion. Further, glass has good resistance to many solvents that may be used to soften the adhesive layer 120. The thickness of the substrate 110 must be selected to ensure mechanical rigidity, and may suitably have a thickness of at least 2 mm, preferably at least 3 mm, such as from 3 to 6 mm, for example 4 mm, 5 mm or 6 mm. The size and shape of the substrate 110 will be dictated by the required size and construction of the solar concentrator into which the optical element is to be incorporated. In certain arrangements, the substrate may be non-planar, but preferably the substrate is planar. Suitably, the substrate maintains the geometry of the adhered focusing polymer foil 170 planar to the extent that it is still working as a focusing element. Planar focusing elements will have some tolerance to being non-planar, typically on the order of 0.5-2 degrees. Hence, the substrate preferably should not deviate more from a planar geometry than this during normal use of the concentrator.

The substrate 110 may preferably have an antireflective layer on surface of the substrate intended to face the incident light, ie the opposite surface of the substrate from that on which the focusing polymer foil 170 is provided. The antireflective layer improves the efficiency of the solar concentrator, by reducing or preventing reflection from the outer surface of the lens. The antireflective layer may be a coating or structuring applied to the surface of substrate 110. Preferably, the antireflective layer is a refractive index gradient antireflective layer, as these are almost independent of wavelength and incident angle. However, a multilayer dielectric antireflective layer film may also be used.

The necessary functional structure to be included in this embodiment is the refractive lens 150. This is mounted in a removable fashion on the surface of the substrate 110 that is to face away from the light that will be incident on the solar concentrator, ie the back side of the substrate 110.

The refractive lens 150 is made from a material or materials that is/are able to transmit light therethrough, and which has/have a refractive index suitable to refract the light passing therethrough to a desired degree to attain the focusing effect of the lens. Suitably, the refractive lens 150 may be made of an optically transparent glass or an optically transparent polymer or polymers (ie a plastics material or materials). For reasons of weight of the resulting optical element and lower brittleness, the use of a polymer or polymers is preferred. In a preferred embodiment, the refractive lens is made from a polymer foil, that is, a flexible sheet of polymer materials, comprising one or more layers of polymeric materials. Suitably, the polymer foil may contain non-polymeric parts, such as UV stabilizers or other additives. Preferably, the polymer foil comprises one or more UV stabilisers to improve the life of the polymer foil in use. Suitable polymers for inclusion in the polymer foil layer are transparent polymers such as polymethylmethacrylate (PMMA), polyethylene (PE), polypropylene (PP)-polyethyleneterephthalate (PET) laminate, or PET-Surlyn laminate. Suitably, the thickness of the polymer foil is less than 200 µm, more preferably less than 100 µm, even more preferably less than 50 µm and most preferably less than 30 µm. The thinner the foil, the lower the material cost for replacement and the lower UV absorption will occur, and hence the more economical the plant will be, and hence a lower focusing element to supporting plate ratio is preferable, in terms of weight and/or thickness of the respective elements. Typically, a 4 mm thick glass substrate (supporting plate) will have a weight of 10 kg/m$^2$, whereas the focusing polymer foil will have a weights of 100-250 g/m$^2$. Thus, a weight ratio for focusing polymer foil:substrate would suitably be in the range 0.05 to 0.1, such as 0.06 to 0.075, or 0.07 to 0.05, preferably 0.01 to 0.025.

The polymer foil 150 can be constructed in a known manner, such as is described in WO2015/081961. For example, due to the small thickness of the focusing polymer foil, it may be manufactured using standard roll-to-roll processes such as extrusion coating, where a carrier foil is laminated to a film melt which is being structured or coated using a structured cooling roller. The structured cooling roller may be manufactured using nickel sleeve technology, or by imprinting a pattern in an imprint layer on the surface of a conventional roller. The use of roll-to-roll processes, when compared to conventional casting or extrusion of thicker Fresnel elements, will have the potential to reduce the cost per square meter from the range of 100$ to the range of 1-2$ per square meter, similar to the cost of traditional packaging foils.

The refractive lens 150 is mounted on the substrate 110 by a layer of switchable adhesive 120. By switchable adhesive is meant a substance that during use of the solar concentrator works as an adhesive, and that can be made less adhesive by subjecting the substance to a controlled outer condition, e.g. heat, pressure or a delamination force, or solvent, in order to remove the two adhered parts from each other. In this embodiment, it is essential that the switchable adhesive is one that can transmit light therethrough. A suitable heat sensitive, or thermoplastic, adhesive is one that softens in order to allow the layer 150 to be removed from the substrate 110 on heating to a temperature significantly above the usual operating temperature of a solar concentrator, such as a temperature of 80° C. Such adhesives include thermoplastic hot melt adhesives. A suitable pressure sensitive adhesive is one that is peelable from the substrate 110 under a force that is not sufficiently high to damage the surface of substrate 110 but is significantly higher than any force to which the optical element would be subjected to in normal use. Such adhesives include adhesives based on an elastomer compounded with a suitable tackifier, for example a rosin ester. Alternatively, the adhesive may be based on acrylics that have sufficient tack on their own and do not require a tackifier. Further options include bio-based acrylates, butyl rubber, ethylene-vinyl acetate (EVA) with high vinyl acetate content, natural rubber, nitriles, silicone rubbers with special tackifiers based on MQ silicate resins (MQ silicate resins are based on a monofunctional trimethylsilane (M) reacted with quadrafunctional silicon tetrachloride (Q)). A suitable solvent sensitive adhesive is one that softens or becomes peelable from the substrate on application of a solvent to which the optical element is not subjected in normal use and which does not cause damage to the substrate 110. For example, where the substrate is glass, an acetone-sensitive or an MIBK-sensitive adhesive may be used. Solvent-sensitive adhesives include thermoplastic hot melt adhesives, and pressure-sensitive adhesives listed above that do not cross link. Regardless of the type of switchable adhesive used, it is preferred that the adhesive should have a higher degree of adherence to the refractive lens 150 than to the substrate 110, in order that, on peeling the refractive lens 150 away from the substrate 110, the adhesive is cleanly removed from the substrate 110 leaving it in a condition suitable for immediate application of a new refractive lens 150 thereto. Such adhesives include acrylate based pressure sensitive adhesives.

The total thickness of the focusing polymer foil 170 (ie layers 120 and 150 in FIG. 15) would suitably be in the range of 30-200 μm.

In use, incident sunlight is irradiated normal to the surface of the substrate 110 on which the Fresnel lens 150 is not adhered, and passes through the substrate 110 and adhesive layer 120 into the Fresnel lens layer 150. On reaching the Fresnel microstructures on the back face of the Fresnel layer 150, the light is deflected to an angle (relative to normal) of twice the Fresnel element tilt angle, and refracted at the polymer-air transition. By controlling the tilt angle as a function of the lateral distance from the focal point, all incident sunlight can be focused. After some time in use, the Fresnel lens 150 will, as a result of environmental degradation such as exposure to UV light, scratching by dust abrasion, and/or oxidation, no longer be in a condition to perform its function to an acceptable degree of efficiency. At this time, the optical element is treated to cause the adhesive layer 120 to soften or become peelable from the substrate 110, and the Fresnel lens layer 150, along with the adhesive layer 120, is removed from the substrate. A new focusing polymer foil 170, comprising Fresnel lens layer 150, along with the adhesive layer 120, may then be applied to the substrate 110, for example by a roll-to-plate process, in order that the optical element can be replaced in the solar concentrator, having restored or improved function.

In an embodiment, the switchable adhesive is a thermoplastic adhesive, and the foil can be easily replaced by heating the plate to above the softening temperature of the thermoplastic adhesive, suitably 80° C. as this temperature is significantly higher than the normal operating temperature reached by the optical element in use. Suitably, the heat is applied by an oven or by application of hot air, for example using a heat gun. Once the adhesive turns soft, the foil can be pulled off and recycled, while the support plate can be coated with a new piece of foil and reused in a solar plant.

In a fourth aspect, the present invention provides a method of manufacture of an optical element according to the first aspect of the invention, the method comprising
(i) providing a substrate;
(ii) forming a microstructured layer on the substrate wherein the microstructures of the microstructured layer are the plurality of groups of circular and concentrically arranged microstructures of the optical element of the first aspect of the invention.

Preferably, as described in WO2020/120638, the method comprises the steps of:
(a) providing a first light-transmissive glass substrate having a front surface on which the electromagnetic radiation is incident in use and a back surface opposite to the front surface;
(b) applying a liquid silicone resin to the back and/or the front surface of the glass substrate;
(c) contacting the liquid silicone resin with a mould such that the liquid silicone resin adopts the form of the mould and forms the microstructured layer extending over the surface(s) of the glass substrate to which the liquid silicone resin has been applied;
(d) curing the liquid silicone resin to form a microstructured light-transmissive silicone layer;
wherein the surface(s) of the glass substrate to which the liquid silicone resin is to be applied is/are roughened.

Suitably, the optical element manufactured by the method is an optical element according to the first aspect of the invention. Accordingly, preferred features of the light transmissive glass substrate(s), the roughening or texturing of the surface(s) of the substrate(s), and the light-transmissive silicone coating(s) mentioned in the first aspect of the invention are preferred in the present aspect of the invention also.

Suitably, the method may further comprise the method of making a mould according to the seventh aspect of the invention, prior to step (c).

Suitably, the liquid silicone resin is one that is suitable for casting. Preferably, the liquid silicone resin is able to be cured by a combination of heat and time in a suitable combination, as discussed below regarding step (d). Details of preferred silicones for the light-transmissive silicone coating are given in the description of the first aspect of the invention, and are also preferred in the present aspect of the invention.

Preferably, step (a) further comprises the step of roughening or texturing the surface(s) of the glass substrate to which the liquid silicone resin is/are to be applied in step (b) in order to provide the roughened surface(s). Preferably, the roughening step comprises treating the surface of the glass substrate itself to increase its roughness, rather than application of a coating having higher roughness than that of the glass substrate surface. Suitably, the roughening can be carried out by any suitable mechanical treatment applied to the surface of the glass substrate, such as blasting or grinding. However, these methods are difficult to control on glass, and so it is preferred that the roughening is conducted by etching the surface of the glass substrate. Preferably, the roughening is in the form of nanostructures formed on the surface(s) of the glass substrate. Preferably, the surface roughness of the surface(s) of the glass substrate is in the form of nanostructures having a height of up to 800 nm, more preferably 600 nm, most preferably 400 nm. Preferably, the nanostructures have a height of 50 nm or more, preferably 100 nm or more, most preferably 200 nm or more. Suitably, the measurement of the heights of the roughness can be an $R_z$ measurement. Thus, the $R_z$ value for the roughened surface is preferably within the range of from 50 nm to 800 nm, more preferably from 100 nm to 600 nm, most preferably from 200 nm to 400 nm. Preferably, the nanostructuring step comprises providing a GRIN antireflective treatment on the surface(s) of the glass substrate.

Alternatively, in step (a), a light transmissive glass substrate already comprising a roughened front and/or back surface, preferably a front and/or back surface having nanostructures thereon as described above, may be provided.

Preferably, where only one of the surface of the glass substrate is to be coated with liquid silicone resin in step (b), the other surface of the glass substrate is provided with an antireflective treatment or coating. Suitably, following step (a) and before step (b) the method further comprises the step of applying an antireflective treatment or coating to the surface of the glass substrate to which the liquid silicone resin is not to be applied in step (b). Suitable antireflective treatments or coatings are described with reference to the first aspect of the invention. Alternatively, in step (a) a light transmissive glass substrate already comprising an antireflective treatment or coating on the surface to which the liquid silicone resin is not to be applied in step (b), preferably an antireflective treatment as described above, may be provided.

In step (b), the application of the liquid silicone resin may carried out by any suitable method known in the art for providing a layer of a liquid on a surface. For example, spin coating (if the substrate size allows) or knife coating can be used. Preferably, however, one or more droplets, pools or areas of liquid silicone resin can be applied to the surface, for example from a nozzle, without any active spreading of the one or more droplets, pools or areas into a continuous layer during the application step. Of course, depending on the viscosity of the liquid silicone resin, and its ability to wet the surface of the glass substrate, the liquid silicone resin may spread to some extent of its own accord.

In step (c), the mould may take any suitable form or be made of any suitable material to form the liquid silicone resin into a coating extending over the back surface of the glass substrate which coating adopts the form of the mould. The mould must also withstand the conditions used in the curing step (d), as it is necessary for the mould to remain in place until the liquid silicone resin is cured. For example, the mould may be a stamp or a structured roller. The mould may be of plastics material, metal, glass or ceramic, and may be flexible or rigid. The mould preferably has a width and length equal to or exceeding the width and length of the light transmissive glass substrate, in order that the whole of the surface of the substrate can be coated with the microstructured light-transmissive silicone coating using a single mould.

Where a structured roller is used as the mould, it is necessary to select the liquid silicone resin, the temperature of the roller, and the speed of rotation of the roller such that the liquid silicone resin is able to fill the structures of the roller and to coat the glass substrate and then to be cured such that it retains its structured form all within the time for which the structured roller remains in contact with the silicone layer on the glass substrate.

Preferably, the mould is a thermoplastic film, one surface of which has formed thereon microstructures that are the inverse of the microstructures that, when adopted by the light-transmissive silicone coating, act to focus the electromagnetic radiation incident on the optical element in use. Preferably, the thermoplastic film is flexible, for example such that it may be peeled from the surface of the silicone coating after curing. In this connection, preferably, the thermoplastic film is a polypropylene film or a polyethylene film, and, preferably, the thermoplastic film has a thickness of from 40 µm to 200 µm. Where a thermoplastic film is used, it is preferably used only for a single moulding step (c).

Where the mould is a thermoplastic film, preferably, in step (c), the contacting of the liquid silicone resin with the mould comprises pressing the thermoplastic film surface on which the microstructures are formed against the liquid silicone resin in order that the liquid silicone resin adopts the form of the microstructures. Preferably, step (c) further comprises aligning the thermoplastic film with the light transmissive glass substrate in order that the thermoplastic film is superimposed on the glass substrate and the whole of the substrate is coated with the microstructured light-transmissive silicone coating. However, it can be envisaged in certain circumstances that it may be desired to provide microstructures over less than the whole area of the substrate, for example to leave a border around the edges of the substrate free from microstructures. In these cases, either a mould that has an area smaller than that of the substrate may be used, or a mould that is only partially covered in microstructures may be used. Preferably, the pressing of the thermoplastic film against the liquid silicone resin also spreads the liquid silicone resin to form a continuous coating extending over the back surface of the glass substrate. Preferably, pressing the thermoplastic film against the liquid silicone resin is carried out using a roller. Where a roller is used, it preferably has a width equal to or exceeding that of the light transmissive glass substrate, in order that even pressure can be applied across the whole width of the substrate. Preferably, the roller is applied with even pressure along the whole of the length of the substrate in order that the liquid silicone resin is patterned and spread uniformly on the whole area of the substrate.

In step (d), the curing may be carried out by any suitable curing method applicable to the chosen liquid silicone resin and which the substrate and the mould is able to withstand; for example, the curing may comprise UV exposure, heat, time, or a combination thereof. Preferably, however, the curing is carried out using a combination of heat and time. For example, for a selected liquid silicone resin, the curing conditions may be 24 hours at ambient temperature, such as at 20° C., 10 hours at 40° C., or 1 hour at 70° C. It will be understood by the skilled person that a balance between the temperature of curing and the time of curing can be found for a given resin depending on the process requirements; for example, the availability of suitable heating apparatus or the time available for curing. Preferably, the curing does not comprise the use of UV radiation to initiate the curing process.

Following the curing step (d), and where the mould is in the form of a stamp, a thermoplastic film, or other suitable form, the mould may be left in place on the cured light-transmissive silicone coating to act as a protective layer for the coating prior to its use as an optical element. This is particularly preferable where the mould is a thermoplastic film as described above.

Where it is desired to provide a microstructured light-transmissive silicone coating on both the front surface and the back surface of the glass substrate, it is possible for steps (b), (c) and (d) of the method to be carried out twice, once for the front and once for the back surface; or for steps (b) and (c) to be carried out twice, once for the front and once for the back surface, followed by step (d) to cure both silicone coatings; or for step (b) to be carried out to both the front and back surfaces of the glass substrate, followed by step (c) on both the front and back surfaces, followed by step (d) on both the front and back surfaces.

Preferably, the method comprises the further step of:
(a) removing the mould from the microstructured light-transmissive silicone coating.

Preferably, the removal step (e), where the mould is a thermoplastic film as described above, comprises peeling of the thermoplastic film from the light-transmissive silicone coating.

As described above for the first aspect of the invention, and particularly where the mould is a thermoplastic microstructured film and is used as a protective layer to be removed from the light-transmissive silicone coating prior to use, the surface(s) of the glass substrate to which the liquid silicone resin is to be applied is/are roughened to ensure that the adhesion between the silicone coating and the glass substrate is greater than the adhesion between the silicone coating and the thermoplastic film, thus ensuring that the removal of the thermoplastic film does not result in removal or partial removal of the silicone coating from the glass substrate.

As described above for the first aspect of the invention, the optical element may further comprise a second light transmissive glass substrate, which may have light transmissive silicone coatings provided on one or both faces thereof. Where the second substrate is provided, the surface roughening and/or the light transmissive silicone coating(s), where provided, are formed according to the method of the fourth aspect of the invention. The two light transmissive glass substrates, with coatings thereon as desired, are then superimposed on one another and fixed together, either in contact with one another, or in a spaced relationship to one another by means of spacers placed between the substrates and adhered or fixed to the substrates. Where the light transmissive silicone coating(s) of the optical element would thereby be placed between the two substrates, it will be understood that the step (e) of removing the mould from the microstructured light transmissive silicone coating(s) must be carried out before the superimposition of the substrates and fixing of them to one another. Suitable sealants, as known to the skilled person, may be used to prevent ingress of the ambient atmosphere between the two substrates, and the area between the two substrates may be filled with a dry gas, such as a dry inert gas.

In a fifth aspect, the present invention provides a method of manufacture of a solar concentrator, comprising the steps of:
(i) providing one or more optical elements for a solar concentrator, the one or more optical elements comprising a plurality of groups of circular and concentrically arranged microstructures around a centre point, which microstructures are arranged to refract light incident normal to the plane of the solar concentrator towards the centre point, wherein:
  the angle of the microstructures with respect to the plane of the optical element within each group increases with increasing radial distance from the centre point;
  the angles of the microstructures with respect to the plane of the optical element of each of the individual groups are selected such as to form a focal area common to all of the groups at a focal plane of the optical element, when illuminated by light incident normal to the plane of the optical element; and
  the angles of the microstructures with respect to the plane of the optical element of each of the individual groups are selected such that, when illuminated by light incident normal to the plane of the optical element, the light refracted from the smallest radial distance from the centre point within a given group and the light refracted from the largest radial distance from the centre point within a given group cross at a plane that is closer to the optical element than is the focal plane;
(ii) arranging the one or more optical elements each to focus solar radiation on to a focal area;
(iii) placing a collector of solar energy at the or each focal area.

Preferably, the one or more optical elements are each according to the first aspect of the invention. Preferably, the solar concentrator is according to the second aspect of the invention. Preferably, the method further comprises manufacture of the one or more optical elements according to the fourth aspect of the invention. Where the optical element according to the first aspect of the invention is used and comprises a protective film on the structured side of the light-transmissive silicone coating, the method preferably further comprises the step of removing the protective film prior to step ii).

Turning to FIG. 15, this Figure shows the manufacture of an embodiment of the optical element of the first aspect of the invention according to an embodiment of the method of manufacture of the fourth aspect of the invention.

Figure 15A:
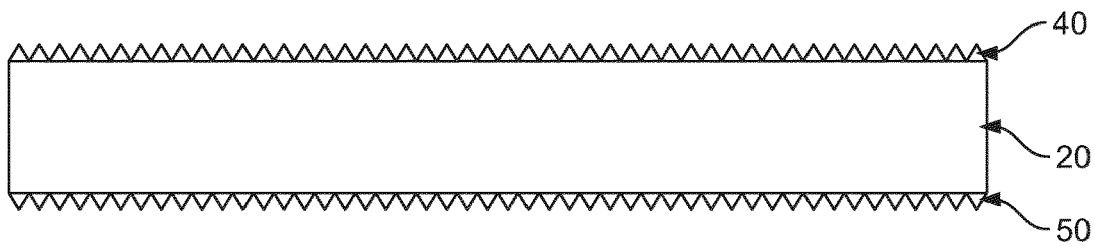
FIG. 15 shows schematically a method of manufacture of an optical element according to an embodiment of the invention.

FIG. 15A is relevant to step (a) of a preferred embodiment of the method of the fourth aspect of the invention, and shows light transmissive glass substrate 20 having antireflective nanostructured coatings 40 and 50 on the back and front surfaces, respectively, thereof.

Figure 15B:
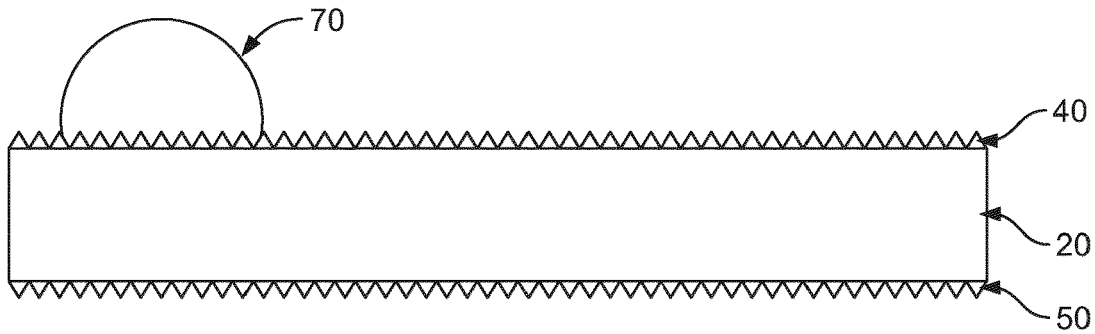

FIG. 15B is relevant to step (b) of a preferred embodiment of the method of the fourth aspect of the invention. A drop or pool of liquid silicone resin 70 is applied to the back surface of the light transmissive glass substrate 20, in contact with the antireflective nanostructured coating 40 on the back surface of the substrate 20. No active steps are taken to spread the drop or pool of the liquid silicone resin 70 on to the substrate 20 to form a continuous coating at this stage.

Figure 15C:
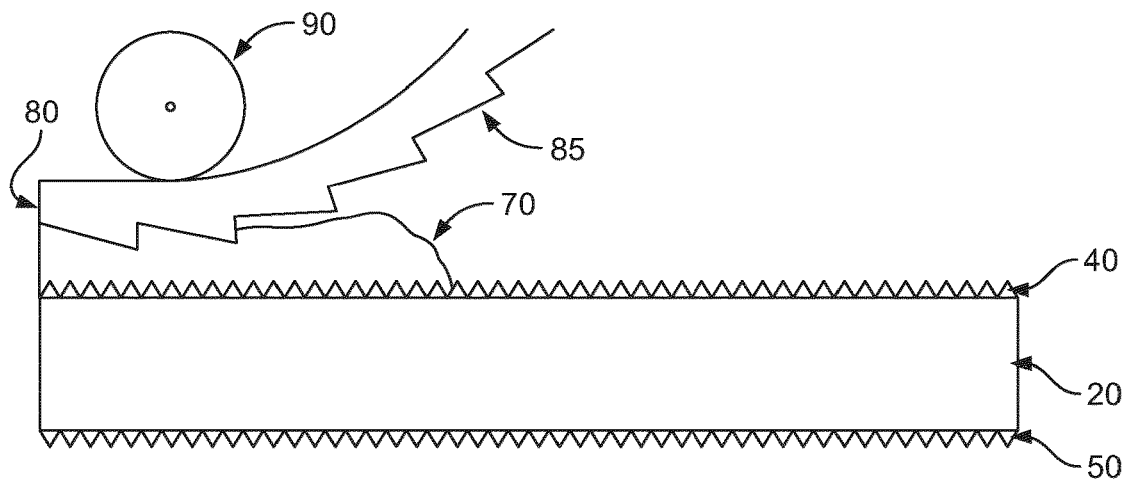

FIG. 15C is relevant to step (c) of a preferred embodiment of the method of the fourth aspect of the invention. A mould in the form of thermoplastic film 80, having the same dimensions as the light transmissive glass substrate 20 and having on one surface Fresnel microstructures 85 that are the inverse of the Fresnel microstructures to be formed on the optical element, is placed in contact with the drop or pool of liquid silicone resin 70 and the edges of the thermoplastic film 80 aligned with the edges of the light transmissive glass substrate 20. A roller 90 having a width equal to or exceeding the width of the light transmissive glass substrate 20 and the thermoplastic film 80 is placed in contact with the unstructured surface of the thermoplastic film 80, that is, the side of the thermoplastic film 80 that is not in contact with the drop or pool of liquid silicone resin 70, and presses the thermoplastic film 80 against the light transmissive glass substrate 20, thus spreading the drop or pool of liquid silicone resin 70 across the back surface of the light transmissive glass substrate 20 such as to coat the back surface, and also causing the liquid silicone resin 70 to adopt the form of the microstructures formed on the thermoplastic film 80. The roller 90 is rolled along the length of the light transmissive glass substrate 20 (from left to right as depicted in FIG. 15C) in order successively to press areas of the thermoplastic film 80 into contact with the liquid silicone resin 70 and against the light transmissive glass substrate 20, until the whole of the thermoplastic film 80 extends over the light transmissive glass substrate 20 and the liquid silicone resin 70 is spread between the thermoplastic film 80 and light transmissive glass substrate 20 and has filled the microstructures 85 of the thermoplastic film 80 so as to adopt their shape.

Figure 15D:
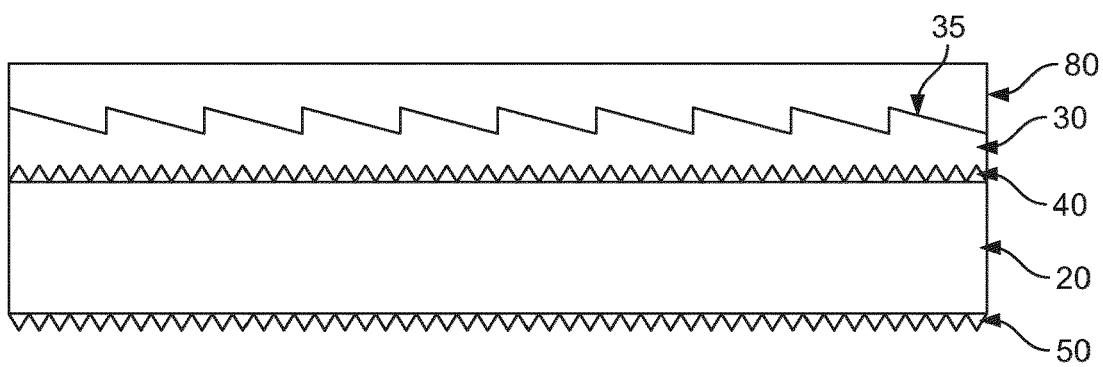

FIG. 15D is relevant to step (d) of a preferred embodiment of the method of the fourth aspect of the invention. The assembly of the light transmissive glass substrate 20, liquid silicone resin 70 and thermoplastic film 80 is subjected to the curing conditions suitable to the liquid silicone resin 70, such as heating at 40° C. for 10 h. During this time, the liquid silicone resin 70 cures and solidifies, permanently adopting the form of the Fresnel microstructures 85 of the thermoplastic film 80, thus forming light-transmissive silicone coating 30 having thereon Fresnel microstructures 35.

The thermoplastic film 80 may be left in contact with the light-transmissive silicone coating 30 following the curing step to function as a protective film until such time as the optical element 10 is incorporated into a solar concentrator or otherwise put into use. At that time, the thermoplastic film 80 can be peeled away from the light-transmissive silicone coating 30 and discarded or reused.

In a second aspect, the present invention provides a solar concentrator comprising an optical element according to the first aspect of the invention.

Suitably, the solar concentrator may comprise more than one optical element according to the first aspect of the invention, such as an array of optical elements. Suitably, each optical element may focus incident radiation on to an associated focal area.

Suitably, the solar concentrator further comprises one or more solar collectors, or receivers, positioned to receive the radiation passing through and focused by the optical element(s). The one or more solar collectors are positioned within the focal area associated with the or each optical element comprised in the solar concentrator. Suitably, the solar collectors may each be selected from photovoltaic cells or a heat exchanger arranged to be heated by the incident solar radiation and to transfer that heat to a heat transfer fluid. Suitably, where the solar collector is a photovoltaic cell, the solar concentrator further comprises wiring and circuitry suitable to transfer the electrical energy produced by the photovoltaic cell to a suitable consumer of, or storage medium for, electrical energy, such as a domestic electrical circuit or a battery. Suitably, where the solar collector is a heat exchanger, the solar collector further comprises conduits suitable to convey the heat transfer fluid to a consumer of heat energy or a storage medium for heat energy, such as a steam generator, or a heat sink.

Preferably, the solar concentrator further comprises a support for the one or more optical elements. Preferably, the support holds the one or more optical elements in a desired orientation. Where more than one optical element is comprised in the solar concentrator, preferably the support holds the plurality of optical elements in a desired relationship to one another. Suitably, the plurality of optical elements may be held in a planar array. Preferably, the support is arranged such that the area of the one or more optical elements through which radiation may be transmitted and focused is maximized; for example, at least 90% of the area of each of the one or more optical elements is available to transmit and focus incident radiation. Suitably, the support may comprise two or more supporting beams extending in a mutually parallel direction, for example with their longitudinal axes aligned and spaced at regular intervals, and preferably with their proximal ends being aligned with one another and their distal ends being aligned with one another, such that the two or more supporting beams define a quadrilateral plane, such as a rectangular or square plane.

Preferably, the solar concentrator further comprises a mount which allows the position of the one or more optical elements with respect to the incident radiation to be adjusted, preferably to allow the one or more optical elements to be placed such that the incident radiation is orthogonal to the plane of the one or more optical elements. Suitably the mount may comprise a swivel joint. Where a support is included in the solar concentrator, the mount is suitably fixed to the support and allows the position of the support to be adjusted. Preferably, the mount further comprises a solar tracker that acts to adjust the position of the one or more optical elements with respect to the incident radiation to maintain the incident radiation orthogonal (or as near as practically possible to orthogonal) to the plane of the one or more optical elements during a period of two or more hours, such as three or more hours, four or more hours, six or more hours, such as eight or more hours, such as 12 or more hours.

In a third aspect, the present invention provides a method of reducing the risk of fire or heat damage caused by light incident non-normal to the plane of a solar concentrator, in which a planar optical element according to the first aspect of the invention is substituted for a conventional planar optical element not according to the invention, such as a non-imaging Fresnel lens or an imaging Fresnel lens, such as those having a relationship between microstructure angle and radius as described above in relation to FIG. 1.

FIG. 16 shows an embodiment of the solar concentrator of the invention. Solar concentrator 100 comprises a support 110 for optical elements 120, 125, 130, 135, 140, 145, 150 and 155. Each optical element 120, 125, 130, 135, 140, 145, 150 and 155 is a planar rectangular light transmissive sheet capable of focusing electromagnetic radiation on to a receiver, or solar collector, 210, 215, 220, 225, 230, 235, 240, 245 respectively. The optical elements are as described above in relation to the first aspect of the invention, and are mounted on the support 110 such that the back surfaces of the optical elements are in contact with the support 110.

The support 110 comprises five supporting beams 160 each having the same length and a rectangular cross section, each extending in a mutually parallel direction with their longitudinal axes aligned and spaced at regular intervals, their distal ends 161 being aligned with one another and their proximal ends 162 being aligned with one another, such that the five supporting beams together define a rectangular plane, on the front face of which, that is, the face on which light is incident in use, are mounted the optical elements 120, 125, 130, 135, 140, 145, 150 and 155 in a planar rectangular arrangement, in this case a 2×4 array. The mounting is by means of clamps bearing on the support beams and the top surfaces of the optical elements, which are screwed together, with a rubber gasket between the clamp plate and the optical element to protect the glass substrate from the force exerted by the clamp. The supporting beams 160 are themselves supported from the back face of the rectangular plane defined by the supporting beams 160 and at the midpoints of their lengths by a mounting beam 170 having a rectangular cross section, which mounting beam is placed crosswise to the supporting beams and on which mounting beam the supporting beams are mounted at regular intervals by brackets on the mounting beam that are screwed to the supporting beams. Mounting beam 170 is itself supported on mounting post 180 whose upper end (as drawn) is movably attached to the longitudinal midpoint of mounting beam 170 by a swivel joint 190 permitting adjustment of the angle of the rectangular plane defined by the supporting beams 160 with respect to the surface on which mounting post 180 is mounted. The swivel joint 190 allows for tracking of the sun in two directions, height and azimuth. The lower end (as drawn) of the mounting post 180 is mounted on a surface on which it is desired to place the solar collector, for example on the ground or on a roof.

Also supported on mounting beam 170 are four receiver mounting supports 250. These each take the form of two rectangular cross-section beams joined to form a T-shape. Each receiver mounting support 250 functions to support two receivers 210 and 230, 215 and 235, 220 and 240, 225 and 245 such that each receiver is held in the focal area of the corresponding optical element 120 and 140, 125 and 145, 130 and 150, 135 and 155 respectively. Accordingly, each receiver is mounted at the two distal ends of the beam forming the transverse line of the T shape, by means of a bracket screwed to the beam and to the receiver. The third end of each of the T shaped receiver mounting supports 250 is joined to the mounting beam 170 such that the plane in which the receivers 210, 215, 220, 225, 230, 235, 240 and 245 are held is parallel to the plane formed by the array of the optical elements 120, 125, 130, 135, 140, 145, 150 and 155.

Each of the receivers 210, 215, 220, 225, 230, 235, 240 and 245 is a heat exchanger, which absorbs the focused sunlight to convert it to heat. A fluid circulates through the heat exchanger and is heated by the incident sunlight. The receivers are connected in series through conduits 275 that carry the circulating fluid through the heat exchangers to allow the fluid to be heated. The fluid is then carried through conduit connection point 260, which itself may be connected to a thermal storage, or to an apparatus requiring thermal power, such as a steam turbine, an absorption cooler or a thermal desalination apparatus.

In use, the swivel joint 190 is adjusted in order that the plane of the array of optical elements can receive incident sunlight 280 orthogonally to the plane of the array. The incident sunlight 280 is transmitted through the optical elements 120, 125, 130, 135, 140, 145, 150 and 155 and focused on to each of the receivers 210, 215, 220, 225, 230, 235, 240 and 245. Here, the focused sunlight 290 is converted into heat by the heat exchanger receivers, and the heat so generated is conveyed through conduits 275 to conduit connection point 260, from where it is conveyed to an apparatus requiring heat, or to suitable storage (not shown). The swivel joint may be provided with a solar tracker (not shown) that acts to maintain the plane of the array of optical elements orthogonal to the incident sunlight 280, or as nearly so as practically possible, in order to maximize the efficiency of collection of solar energy by the solar collector.

In a sixth aspect, the present invention provides a mould for use in the manufacture of an optical element according to the fourth aspect of the invention, wherein the optical element comprises:
  a light-transmissive glass substrate having a front surface on which the electromagnetic radiation is incident in use and a back surface opposite to the front surface; and
  a light-transmissive silicone coating on the back and/or the front surface of the substrate; wherein the silicone coating has formed thereon the plurality of groups of concentric and circularly arranged microstructures of the optical element of the first aspect of the invention, and
  wherein the surface(s) of the glass substrate on which the silicone coating is formed is/are roughened;
  in which the mould is for shaping a liquid silicone resin on a glass substrate, and wherein the mould is a thermoplastic film, one surface of which has formed thereon microstructures that are the inverse of the microstructures that, when adopted by the silicone coating, provide the plurality of groups of concentric and circularly arranged microstructures.

In a seventh aspect, the present invention provides a method of manufacture of a mould of the sixth aspect of the invention, the method comprising the steps of:
  (i) providing a rotating extrusion coating roller for a polymer extrusion coating process using a thermoplastic material, which extrusion coating roller has the microstructures formed on its surface;
  (ii) maintaining the temperature of the rotating extrusion coating roller below the solidification temperature of the thermoplastic material;
  (iii) moving a carrier foil between the rotating extrusion coating roller and a rotating counter pressure roller at a given velocity corresponding to the rotational velocity of the rotating extrusion coating roller
  (iv) continuously applying a melt of the thermoplastic material between the moving carrier foil and the rotating extrusion coating roller, whereby said thermoplastic melt is solidified upon contact with said extrusion coating roller, thereby forming a solid microstructured thermoplastic coating on said carrier foil, which coating has formed thereon microstructures that are the inverse of the microstructures that provide the plurality of groups of concentric and circularly arranged microstructures of the optical element of the first aspect of the invention.

Suitably, the extrusion coating roller is a steel cooling roller coated with a metal master, such as a nickel sleeve, having microstructures formed thereon. Alternatively, the microstructures can be formed by imprinting them on the surface of a conventional extrusion coating roller. The microstructures may be formed in the metal master using any suitable method, such as single point diamond turning. Suitably, the extrusion coating roller and/or the counterpressure roller may be cooled by any suitable cooling method, such as by circulation of water or other coolant fluid through the interior of the roller.

Suitably, the carrier foil is a thermoplastic foil having a softening temperature that is sufficiently high that the extrusion of molten polymer thereon will not cause softening or deformation of the carrier foil. Suitable carrier foil materials are PET (polyethylene terephthalate) or nylon. Preferably, the carrier foil is PET (polyethylene terephthalate). Suitably, the thickness of the carrier foil is from 12 µm to 75 µm, such as 50 µm.

Suitably, the thermoplastic material is a thermoplastic polymer having a softening temperature that is sufficiently lower than that of the carrier foil that the molten thermoplastic polymer can be applied to the carrier foil without causing softening or deformation of the carrier foil. Suitable thermoplastic materials include polyethylene, polypropylene, or ionomer resins such as Surlyn®. Preferably, the thermoplastic material is polypropylene. Suitably, the thickness of the melt of the thermoplastic material that is applied to the moving carrier foil is from 10 to 80 µm, preferably 30 µm to 60 µm, such as 45 µm.

Suitably, the mould, and thus the carrier foil, has the same width as the glass substrate to which it is intended to apply the mould; accordingly, the width dimensions discussed above with respect to the glass substrate are also preferable for the mould and the carrier foil.

As it is preferred in some aspects of the invention to use the mould not only as a mould but also as a protective film to protect the microstructured silicone coating during storage and transit prior to installation of the optical element in a solar concentrator, it is preferred that the materials used for the carrier foil in particular, and to some extent also the thermoplastic material, are chosen with this purpose in mind. Thus, the carrier foil, which is exposed to the surroundings when the mould is left in place as a protective film, should be resistant to scratching and abrasion to ensure that the silicone coating is untouched by such contacts with the mould. Preferably, therefore, the carrier foil is PET.

Figure 17:
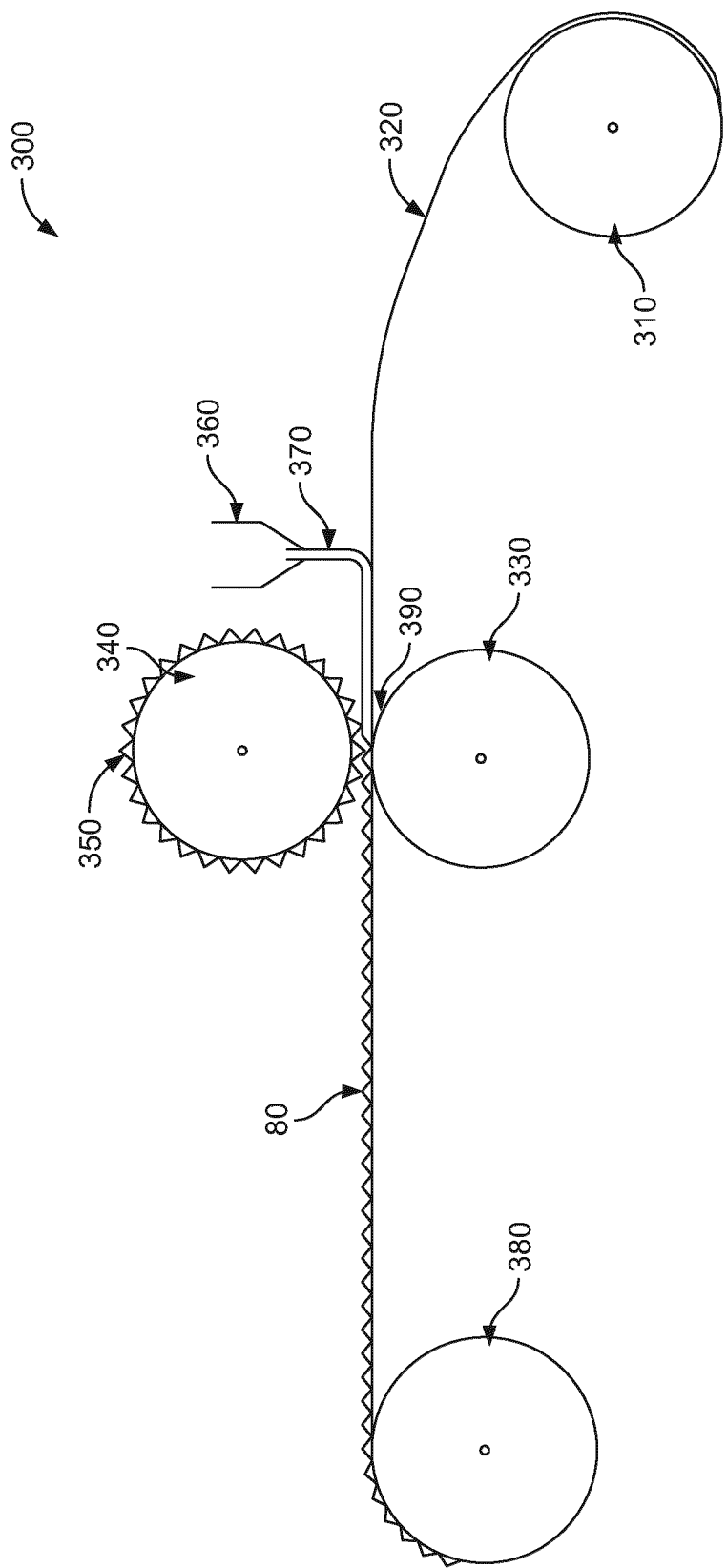
FIG. 17 shows apparatus for the manufacture of a mould for forming the microstructures in an embodiment of the optical element of the invention.

FIG. 17 depicts the manufacture of a mould, in the form of a microstructured thermoplastic film 80, for shaping a liquid silicone resin on the surface of a glass substrate. Manufacturing apparatus 300 comprises an unwind roller 310 on which a carrier foil 320 is wound, counter pressure roller 330 opposed to structured roller 340 coated with a metal master on which circular Fresnel lens microstructures 350 are made by single point diamond turning, nozzle 360 for delivering polymer melt 370 on to the surface of carrier film 320, and wind-up roller 380 on to which the microstructured thermoplastic film 80 is wound following its manufacture. The counter pressure roller 330 and structured roller 340 are positioned such as to form a nip 390 therebetween, through which the carrier foil 320 and polymer melt 370 pass.

In use, the carrier foil 320, such as a PET carrier foil, suitably having a thickness of 50 μm, is partially unwound from unwind roller 310, passed beneath nozzle 360 and through nip 390 between the counter pressure roller 330 and structured roller 340, and attached to the wind up roller 380. Beads or pellets of a thermoplastic polymer such as polypropylene are loaded into an extruder (not shown), and heated and extruded through nozzle 360 to form a polymer melt 370 which is formed as a layer, suitably of 60 μm thickness on carrier foil 320 upstream of nip 390. Simultaneously, carrier foil 320 is unwound from unwind roller 310 and wound onto wind up roller 380 such as to move the carrier foil 320 at a chosen speed through nip 390, and polymer melt 370 is extruded onto carrier foil 320 upstream of nip 390 at a chosen extrusion rate, such that the polymer melt 370 is supported on carrier foil 320 as it passes through nip 390. Passage of the polymer melt 370 through nip 390 results in the polymer melt being pressed against the microstructures 350 formed on the surface of structured roller 340 and adopting the form of the microstructures 350. In order to facilitate this structuring step, structured roller 340 and/or counter pressure roller 330 is maintained at a temperature below the solidification temperature of the polymer melt such that the polymer melt 370 is sufficiently fluid to adopt the form of the microstructures 350, but sufficiently viscous to maintain the form of the microstructures 350 once the melt has passed through nip 390 and is no longer in contact with the microstructures 350 of structured roller 340. Downstream of nip 390, the carrier foil 320 and microstructured polymer melt together form microstructured thermoplastic film 80. Suitably, active cooling means (not shown) may be provided downstream of nip 390 (ie in the direction of the wind-up roller 380) to speed the solidification of the microstructured polymer melt.

EXAMPLES

Example 1

A safer lens with dimensions of 1400 mm by 1400 mm and a focal distance of 2000 mm is made by the following procedure: Optical element geometry according to the principles described above is calculated, where the desired on-axis focal area has a diameter of 100 mm. Bands (groups of microstructures) each having a radial width (2×) of 80 mm are defined, where the inner 40 mm of the group projects the light to the outer 40 mm of the focal area without crossing the centre of focus of the lens between the lens and the focal plane, and the outer 40 mm projects the light to the opposite outer 40 mm of the focal area with the light having crossed the centre of focus between the lens and the focal plane. This leaves a central area having a radius of 10 mm centred on the centre of focus on to which no light is directed, as shown in FIG. 12. The distribution of angles of the individual prisms is advantageously done in such a way that more prisms direct the light to the outer part of the focal area, in order to compensate for the higher area closer to the edge, so a uniform energy distribution is obtained.

In order to produce the required structuring of the optical element, a brass master is first created with the required geometry cut by single point diamond turning with a line depth of 50 μm and varying pitch (line width). The master is used to create a tool or cliché for mass production of polymer film by roll-to-roll extrusion coating (R2R-EC). A large number of thermoplastic polymeric replicas are produced by said R2R-EC method to form a web of thermoplastic film having formed therein a plurality of replicas of the structures formed in the tool or cliché, as described above in connection with FIG. 17. The said polymer replicas are used as a casting web for a silicone casting process on a glass substrate, as described in detail above in connection with FIG. 15. After curing of the silicone resin, the polymeric film is removed and the desired optical element has been created. Subsequently and optionally, the optical element can further be improved by adding an extra layer of glass on the side of the silicone in order to protect the silicone and make cleaning of the outer surface of the optical element easier.

Example 2

A safer lens with dimensions of 1400 mm by 1400 mm and a focal distance of 2000 mm is made by the following procedure: Optical element geometry according to the principles described above is calculated, where the desired on-axis focal area has a diameter of 60 mm. Bands (groups of microstructures) each having a radial width (2×) of 80 mm are defined, where the inner 40 mm projects the light to the outer 20 mm of the focal area without crossing the centre of focus of the lens between the lens and the focal plane, and the outer 40 mm projects the light to the opposite outer 20 mm of the focal area with the light having crossed the centre of focus between the lens and the focal plane. This leaves a central area having a radius of 10 mm centred on the centre of focus on to which no light is directed, as shown in FIG. 12. The distribution of angles of the individual prisms is advantageously done is such a way that more prisms direct the light to the outer part of the focal area, in order to compensate for the higher area closer to the edge, so a uniform energy distribution is obtained.

In order to produce the required structuring of the optical element, a brass master is first created with the required geometry cut by single point diamond turning with a line depth of 50 μm and varying pitch (line width). The master is used to create a tool or cliché for mass production of polymer film by roll-to-roll extrusion coating (R2R-EC). A large number of thermoplastic polymeric replicas are produced by said R2R-EC method, to form a web of thermoplastic film having formed therein a plurality of replicas of the structures formed in the tool or cliché. An adhesive layer is formed on the side of the web opposite to that on which the replicas are formed. The said thermoplastic replicas are laminated onto a glass substrate using the adhesive layer and hence the optical element is created, as described above in connection with FIG. 14. Subsequently and optionally, the optical element can further be improved by adding an extra layer of glass on the side of the polymer side in order to protect the polymer and make cleaning of the outer surface of the optical element easier.

Whilst the invention has been described with reference to preferred embodiments, it will be appreciated that various modifications are possible within the scope of the invention.

In this specification, unless expressly otherwise indicated, the word 'or' is used in the sense of an operator that returns a true value when either or both of the stated conditions is met, as opposed to the operator 'exclusive or' which requires that only one of the conditions is met. The word 'comprising' is used in the sense of 'including' rather than in to mean 'consisting of'. All prior teachings acknowledged herein are hereby incorporated by reference. No acknowledgement of any prior published document herein should be taken to be an admission or representation that the teaching thereof was common general knowledge in Australia or elsewhere at the date hereof.

The invention claimed is:

1. A planar non-imaging optical element for a solar concentrator comprising a plurality of groups of circular and concentrically arranged microstructures around a centre point, which microstructures are arranged to refract light incident normal to the plane of the solar concentrator towards the centre point, wherein:
    the angle of the microstructures with respect to the plane of the optical element within each group increases with increasing radial distance from the centre point;
    the angles of the microstructures with respect to the plane of the optical element of each of the individual groups are selected such as to form a focal area common to all of the groups at a focal plane of the optical element, when illuminated by light incident normal to the plane of the optical element; and
    the angles of the microstructures with respect to the plane of the optical element of each of the individual groups are selected such that, when illuminated by light incident normal to the plane of the optical element, the light refracted from the smallest radial distance from the centre point within a given group and the light refracted from the largest radial distance from the centre point within a given group cross at a plane closer to the optical element than is the focal plane.

2. The planar non-imaging optical element of claim 1, wherein the common focal area includes, or surrounds, a centre of focus which is the projection of the centre point of the lens normal to the plane of the optical element on to the focal plane.

3. The planar non-imaging optical element of claim 1, wherein the optical element is in the form of a Fresnel lens.

4. The planar non-imaging optical element of claim 1, wherein the angle of the microstructures with respect to the plane of the optical element within each group increases linearly with increasing radial distance from the centre point.

5. The planar non-imaging optical element according to claim 1, wherein the common focal area surrounds, but does not include, the centre of focus and a surrounding area having a radius calculated as the product of the distance between the plane of the optical element and the focal plane measured normal to the plane of the optical element, and the tangent of 0.275°.

6. The planar non-imaging optical element according to claim 1, wherein the point at which the refracted light from the smallest radial distance from the centre point of the optical element within a given group crosses the focal plane and the point at which the refracted light from the largest radial distance from the centre point of the optical element within a given group crosses the focal plane are further apart than the distance between the smallest radial distance from the centre point and the largest radial distance from the centre point of the optical element within that group.

7. The planar non-imaging optical element according to claim 1, wherein the plane at which the refracted light from the smallest radial distance from the centre point of the optical element within a given group crosses the refracted light from the largest radial distance from the centre point of the optical element within the same group is closer to the plane of the optical element than X times the focal distance of the optical element, where X is smaller than 1, preferably smaller than 0.9, more preferably smaller than 0.8, yet more preferably smaller than 0.7, such as smaller than 0.6, more preferably smaller than 0.5, yet more preferably smaller than 0.4, such as smaller than 0.3, more preferably smaller than 0.2, yet more preferably smaller than 0.1.

8. The planar non-imaging optical element according to claim 1, wherein at least one of the groups of microstructures is divided into a subgroup of smaller radius and a subgroup of larger radius by a discontinuity in the gradient of the angles of the microstructures such that none of the microstructures of either subgroup refract normally incident light to be incident upon the centre of focus at the focal plane, and preferably wherein none of the microstructures of either subgroup refract normally-incident light to be incident upon an area surrounding the centre of focus at the focal plane having a radius calculated as the perpendicular distance between the optical element and the focal plane×tan 0.275°.

9. The planar non-imaging optical element according to claim 8, wherein, within each subgroup, the angle of deflection at the smallest radius and at the largest radius within each subgroup cause light incident at each of these radii to cross at a plane closer to the optical element than is the focal plane.

10. The planar non-imaging optical element according to claim 8, wherein the angles of deflection of the microstructures of the subgroup of larger radius refract normally-incident light such that it crosses a line joining the centre point of the optical element to the centre of focus before it is incident upon the focal plane, and the angles of deflection of the microstructures of the subgroup of smaller radius refract normally-incident light such that it does not cross a line joining the centre point of the optical element to the centre of focus before it is incident upon the focal plane.

11. A solar concentrator comprising an optical element according to claim 1.

12. The use of an optical element according to claim 1 in a manner effective to focus light incident normal to the plane of the optical element and to diffuse non-normal incident light.

13. The use of claim 12, wherein the use occurs in a manner effective to reduce heating caused by the non-normal incident light.

14. The use of claim 12, further comprising:
    a) identifying a solar concentrator comprising a Fresnel lens;
    b) replacing the Fresnel lens with the optical element; and
    c) using the optical element that replaces the Fresnel lens to focus and diffuse incident sunlight.

15. The use of claim 14, wherein the Fresnel lens is an imaging Fresnel lens.

16. The use of claim 14, wherein the Fresnel lens is a non-imaging Fresnel lens.

* * * * *